(12) United States Patent
Lancaster, Jr.

(10) Patent No.: US 9,433,203 B2
(45) Date of Patent: Sep. 6, 2016

(54) METHOD AND APPARATUS FOR REPELLING FLYING INSECTS

(71) Applicant: Lancaster Outdoor Inc., Shelbyville, KY (US)

(72) Inventor: Victor Allen Lancaster, Jr., Louisville, KY (US)

(73) Assignee: Lancaster Outdoor, Inc., Shelbyville, KY (US)

( * ) Notice: Subject to any disclaimer, the term of this patent is extended or adjusted under 35 U.S.C. 154(b) by 323 days.

(21) Appl. No.: 14/283,448

(22) Filed: May 21, 2014

(65) Prior Publication Data

US 2014/0345196 A1    Nov. 27, 2014

Related U.S. Application Data

(60) Provisional application No. 61/827,197, filed on May 24, 2013.

(51) Int. Cl.
*A01M 29/00* (2011.01)
*A01M 29/06* (2011.01)

(52) U.S. Cl.
CPC ..................... *A01M 29/06* (2013.01)

(58) Field of Classification Search
CPC ............................. A01M 26/06; A01M 29/12
USPC ................................... 47/66.6, 66.7
See application file for complete search history.

(56) References Cited

U.S. PATENT DOCUMENTS

| 7,712,249 | B1* | 5/2010 | Modlin | A01M 1/205 239/102.2 |
|---|---|---|---|---|
| 2007/0258865 | A1* | 11/2007 | Yamasaki | A01M 1/2033 422/124 |
| 2015/0075445 | A1* | 3/2015 | Shi | B01F 3/04085 119/712 |
| 2015/0313104 | A1* | 11/2015 | Cottrell | A01G 1/001 47/62 A |

* cited by examiner

*Primary Examiner* — Monica Williams
*Assistant Examiner* — Aaron Rodziwicz
(74) *Attorney, Agent, or Firm* — Cooley LLP

(57) ABSTRACT

The present disclosure provides an apparatus and method for repelling flying insects. In particular, the present apparatus and method is effective at repelling mosquitoes via the mechanical movement of air in a space that is subject to mosquito presence. The mechanical movement of air is achieved via the utilization of a centrifugal fan system contained in the disclosed apparatus. The present apparatus also comprises a compartment suitable for containing a substrate that may be utilized as a habitat for plants.

18 Claims, 30 Drawing Sheets

700

800

700

800

102

METHOD AND APPARATUS FOR REPELLING FLYING INSECTS

CROSS-REFERENCE TO RELATED APPLICATION

The present application claims priority to U.S. Provisional Application No. 61/827,197, filed on May 24, 2013, the entire contents of which are hereby incorporated by reference.

FIELD

The present disclosure relates to an apparatus and method for repelling flying insects.

BACKGROUND

Insects have long presented problems to human populations. Insects are known to carry various diseases and spread these diseases across both human and other animal populations. The diseases spread by insects are well known and there have been numerous attempts at developing effective products to combat the health problems associated with insects.

Besides the serious disease causing problems attributable to insects, the animals also present a general nuisance to humans attempting to engage in recreational outdoor activities. For instance, insects are a common pest at family picnics and outdoor sporting events. The nuisance of insects is also acutely felt when persons engage in leisurely outdoor enjoyment such as swimming in a pool, sunbathing on a deck, congregating with friends on an outdoor patio, and when attempting to barbeque outdoors.

Thus, it is evident that insects present numerous problems, both health wise and as a general nuisance to humans.

Because of the problems associated with insects, people have developed numerous strategies for both: killing them with the use of insecticides and repelling them with the use of repellants.

One goal of an insect repellant, is to control the behavior of an insect by directing or repelling the insect away from locations in which its presence is not desired. People are better able to enjoy outdoor recreational activities when insects have been effectively repelled away from the area.

To date, most insect repellant technology has focused on chemical agents. These chemical repellants rely upon application of the active ingredient to the skin of a human or to a designated area such as clothing. Often, these chemical repellants suffer from one or more drawbacks including: (1) toxicity if over applied, (2) allergic reactions in susceptible (3) diminished efficacy as a function of time since application, (4) detrimental environmental effects, (5) irritants of the eyes and respiratory track-especially chemical repellants applied as an aerosol, (6) costs associated with continual application, (7) small area of effective insect control.

Therefore, there is a great need in the art to develop insect repellant technology that does not suffer from the drawbacks associated with chemical based insect repellants. In particular, the art suffers front a lack of insect repellant technology that is suitable for repelling insects away from large outdoor spatial areas, e.g. decks, patios, and pool areas.

BRIEF SUMMARY

The present disclosure provides insect repellant technology that is effective at repelling, insects away from entire outdoor spatial areas.

In an aspect, the present insect repellant technology is not chemically-based and therefore does not suffer from many of the drawbacks associated with present chemical repellants.

In an embodiment, the present disclosure provides for a mechanical apparatus that is suitable to repel insects. In particular, the present disclosure provides an apparatus that is extremely effective at repelling flying insects. Any flying member of the class Hexapoda may be effectively repelled by the present apparatus. Mention may be made of the following orders that may comprise members that are effectively repelled by the present apparatus: Ephemeroptera, Odonata, Orthoptera, Dictyoptera, Isoptera, Hemiptera, Coleoptera, Trichoptera, Lepidoptera, Diptera, and Hymenoptera. In particular embodiments, the present apparatus is effective at repelling members of the mosquito family Culicidae. All species of mosquito are effectively repelled by the present apparatus.

The present apparatus, in a first embodiment, comprises a centrifugal fan system housed within a container, said container comprising portions suitable for holding a substrate in which plants may grow.

Thus, in an aspect, the present apparatus comprises a centrifugal fan system that is incorporated into a planter box. The planter box is suitable for holding a substrate, in which plants may grow, including: rocks, sand, soil, peat, mulch, polymer planting gels, water, compost, and any other material capable of providing a suitable substrate. The volume of the portion of the planter box suitable for holding the planting substrate can vary greatly, for instance, 0.01 to 0.1 cu. ft., 0.1 to 1.0 cu. ft., 1 to 2 cu. ft., 2 to 3 cu. ft., 3 to 4 cu. ft., 5 to 6 cu. ft., 6 to 7 cu. ft., 7 to 8 cu. ft., 8 to 9 cu. ft., 9 to 10 cu. ft., 10 to 20 cu. ft., 20 to 50 cu. ft., 50 to 100 cu. ft., 100 to 1000 cu. ft., 1000 to 10,000 cu. ft.; or the volume of the planting area of the planter box can be expressed as, 0.00028 to 0.0028 $m^3$, 0.0028 to 0.028 $m^3$, 0.028 to 0.057 $m^3$, 0.057 $m^3$ to 0.085 $m^3$, 0.085 $m^3$ to 0.113 $m^3$, 0.113 to 0.142 $m^3$, 0.142. to 0.170 $m^3$, 0.170 to 0.198 $m^3$, to 0.198 to 0.227 $m^3$, 0.227 to 0.255 $m^3$, 0.255 to 0.283 $m^3$, 0.283 to 0.566 $m^3$, 0.566 to 1.42 $m^3$, 1.42 to 2.83 $m^3$, 2.83 to 28.32 $m^3$, 28.32 to 283.17 $m^3$.

In an embodiment, the planter box comprises a housing with an internal compartment in which the centrifugal fan system is located. The centrifugal fan system is protected from the elements by the planter box's external walls. In this embodiment, the planter box with the internal centrifugal fan system housed therein, comprises a planting area component at the top of the planter box that comprises the area suitable for growing plants and containing the substrate. In this embodiment, the planting area component is separated from the centrifugal fan system by an appropriate impervious layer located above the fan system and below the planting area component suitable for housing the planting substrate.

The present disclosure also provides methods of repelling insects. In an embodiment, the present methods are effective at repelling insects away from entire outdoor spatial areas.

In an aspect, the present insect repellant methods are not chemically based and therefore do not suffer from many of the drawbacks associated with methods of repelling insects that are based upon chemical repellants.

In one aspect, the present disclosure teaches a method of repelling flying insects. Particular flying insects that may be repelled by the present methods are, e.g., any flying member of the class Hexapoda. Mention may be made of the following orders that may comprise members that are effectively repelled, by the present methods: Ephemeroptera, Odonata, Onhoptera, Diciyopiera, Isopiera, Hemipiera, Coleopiera, Trichopiera, Lepitioptera, Dipiera, and Ilymenoprera. In particular embodiments, the present methods are effective at repelling members of the mosquito family Culicidele. All species of mosquito are effectively repelled by the present methods.

In aspects, the presently disclosed apparatus and method is capable of repelling mosquitoes to a larger degree than would be observed had the apparatus and method not been utilized. For instance, the apparatus and methods of the present disclosure exhibit increased repellency of at least about 10% or more, about 20% or more about 30% or more, about 40% or more, about 50% or more, about 60% or more, about 70% or more, about 80% or more, about 90% or more, about 95% or more, about 98% or more, about 99% or more, or about 100%, relative to the amount of mosquito repellency that would be observed had the present apparatus and method not been utilized.

In yet other aspects, the presently disclosed apparatus and method is capable of repelling mosquitoes in an area comprising from about 1 to 10 sq. ft., 10 to 20 sq. ft., 20 to 30 sq. ft., 30 to 40 sq. ft., 40 to 50 sq. ft., 50 to 0.100 sq. ft., 100 to 1000 sq. ft., or more.

In embodiments, the present apparatus and methods exhibit greater mosquito repellency relative to traditional chemical-based repellant technology. For example, embodiments of the present disclosure exhibit repellant efficacy of about at least 10% or more, about 20% or more, about 30% or more, about 40% or more, about 50% or more, about 60% or more, about 70% or more, about 80% or more, about 90% or more, about 95% or more, about 98% or more, about 99% or more, or about 100%, as compared to chemical-based mosquito repellants.

Aspects of the present apparatus and method are capable of reducing the density of a population of mosquitoes in a given area by 5% or more, 10% or more, 20% or more, 30% or more, 40% or more, 50% or more, 60% or more, 70% or more, 80% or more, 90% or more, or even 100% density reduction in a mosquito population in a given area may be achievable.

For instance, congregations of people engaged in socializing on an outdoor patio would find an insect repellant technology that repelled insects from the immediate area in and around the patio to be much more desirable than the current chemical-based repellants that would require each individual person to apply the repellant to their skin and clothing.

These and other features, aspects, and advantages of embodiments of the present disclosure will become better understood with regard to the following description, claims, and accompanying drawings explained below.

BRIEF DESCRIPTION OF THE DRAWINGS

FIG. 14 illustrates a top view of the top planting area component of an embodiment of the disclosed apparatus, as presented in FIG. 13. The figure also illustrates a drainage hole that the drainage hose from FIG. 13 is able to connect with.

DETAILED DESCRIPTION

Figure 1:
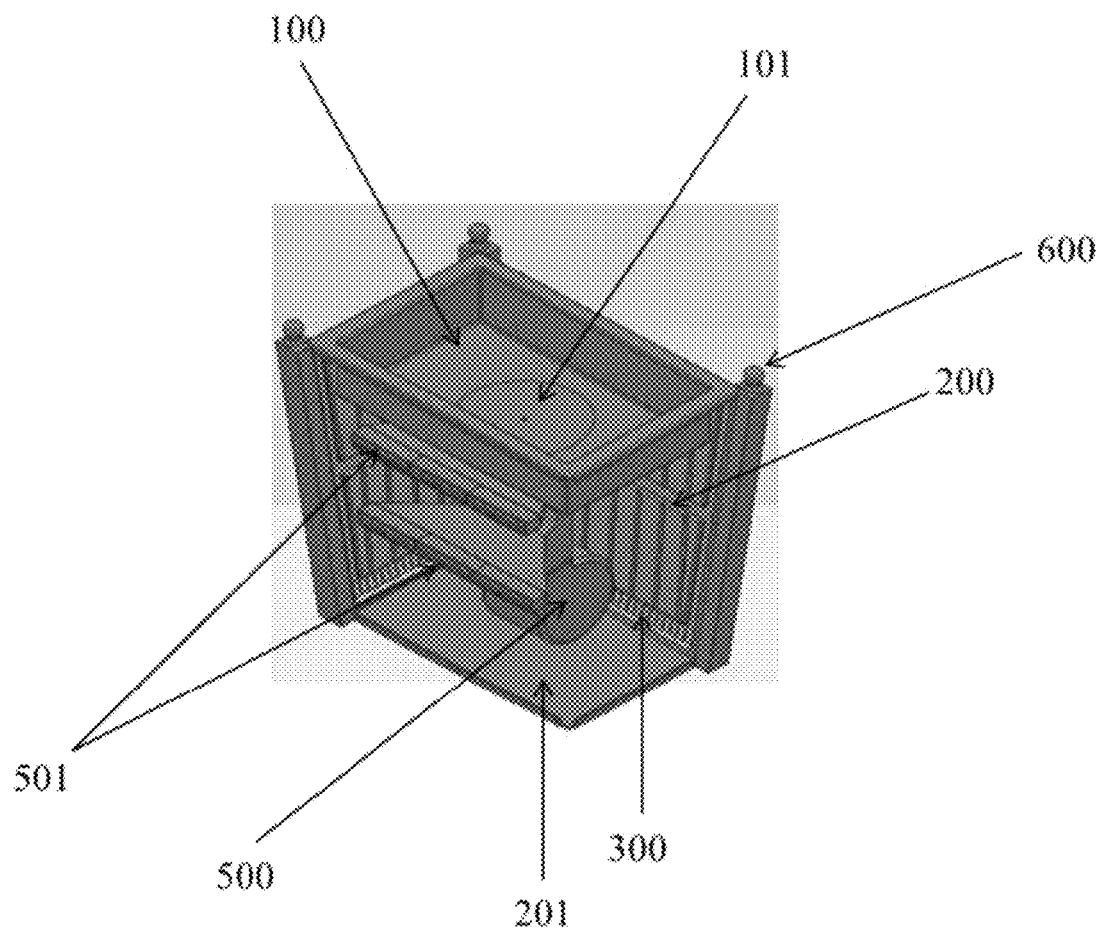
FIG. 1 illustrates an interior view of an embodiment of the disclosed apparatus. The figure illustrates a centrifugal fan system that may be utilized.

Detailed descriptions of one or more preferred embodiments are provided herein, it is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

The nuisance presented by flying insects, and in particular mosquitoes, is troublesome for people attempting to enjoy outdoor recreational activities. Finding effective apparatuses and methods to combat mosquitoes can greatly enhance the ability of people to utilize outdoor spaces.

Presented herein is an apparatus that effectively repels mosquitoes across a large area of square footage. In particular embodiments, the apparatus does not rely upon chemical mechanisms of repelling the insects. Rather, in certain embodiments, the apparatus comprises a fan system that generates an artificial air current that is referred to throughout the application as "wind." The fan system generates winds with a speed high enough to disrupt the flight ability of flying insects and in particular mosquitoes. Thus, particular embodiments of the present apparatus do not suffer from the drawbacks inherent with chemical based repellant technology.

However, as set forth below, certain embodiments of the disclosed apparatus are capable of use with chemical repellant technology.

The disclosed apparatus does not merely provide effective insect repellency. Rather, the apparatus also serves as a suitable device in which to grow plants. That is, in a preferred embodiment, the apparatus comprises an area suitable for the effective planting and growing of a wide variety of plant species.

Reference will now be made to the drawings of various embodiments of the disclosed apparatus, wherein like reference numerals refer to like parts throughout. An embodiment of the mosquito repelling apparatus will now be described with reference to FIG. 1.

In this example, the apparatus includes a means for containing a substrate 100 suitable for growing a plant. The means for containing the substrate suitable for growing a plant 100 is also referred to as the planting area component. Either term is meant to the interchangeable. Thus, the planting area component 100 of the apparatus may comprise four walls and a bottom surface. The four walls and bottom surface of the planting, area component are not individually numbered in the FIG.

The term "bottom surface" is utilized for the "bottom" of the planting area component 100 so as to avoid confusion with the "base" 201 of the containment component. The containment component comprises the walls 200 and base 201.

The bottom surface of the planting area component 100 may comprise a drainage hole 101. The planting area component 100 may be made out of the same material as the rest of the apparatus, or a different material. That is, the planting area component 100 may be made of the same or different material as the containment component, said containment component comprising the walls 200 and base 201.

The apparatus of FIG. 1 also illustrates four walls 200. These walk 200, along with the base 201, and planting area component 100, enclose an interior portion of the apparatus. The planting area component 100 is structured to sit atop of the four walls 200. The planting area component 100 may be easily removable from the four walls 200, or the planting area component 100 may be permanently affixed to the top of the apparatus. The apparatus comprises air intake vent apertures 300 at the bottom of the walls 200. These air intake vent apertures 300 may be in any size or arrangement. The air intake vent apertures 300 are depicted in this embodiment at the bottom of the apparatus, but it is contemplated in other embodiments that the air intake vents could be placed into any area of the walls 200. Further, in some embodiments, the air intake vent apertures 300 may be placed into the base 201 of the apparatus. The exterior of the base 201 of the apparatus may be seen in FIG. 12, panel A.

The apparatus comprises a fan system 500. In the embodiment illustrated, in FIG. 1., the fan system 500 is a centrifugal fan. Other embodiments may comprise other fan types, e.g. axial fans or crossflow fans. The fan system 500 comprises fan system air exhaust vents 501. These vents discharge the air produced by the fan system. In some embodiments, there may be six fan system air exhaust vents 501, as depicted in this figure. However, there may also be from 1 to 10 fan system air exhaust vents 501, or any range between 1 to 10 vents. Further, some embodiments contemplate anywhere from 1 to 20 fan system air exhaust vents 501. In the embodiment depicted in FIG. 1, the six fan system air exhaust vents 501 are each moveable in different directions, such that the wind generated by the fan can be directed to six different places. Thus, embodiments of the present apparatus are able to provide artificial wind in a multi-directional manner, because the fan system air exhaust vents 501 may be moved to different positions, much like an air vent in the interior of an automobile may be positioned. The fan system air exhaust vents 501 may be positioned up, down, to the left., and to the right. The embodiment also depicts a lighting component 600, which may illuminate plants that are planted within the planting area component 100.

The centrithgal fan may comprise an internal fan wheel with a diameter of from about 2 to 5 inches, about 5 to 10 inches, about 5 to 15 inches, about 5 to 20 inches, about 10 inches, about 10 to 15 inches, about 10 to 20 inches, about 15 to 20 inches, and about 20 to 40 inches.

An embodiment of the mosquito repelling apparatus will now be described with reference to FIG. 2.

Figure 2:
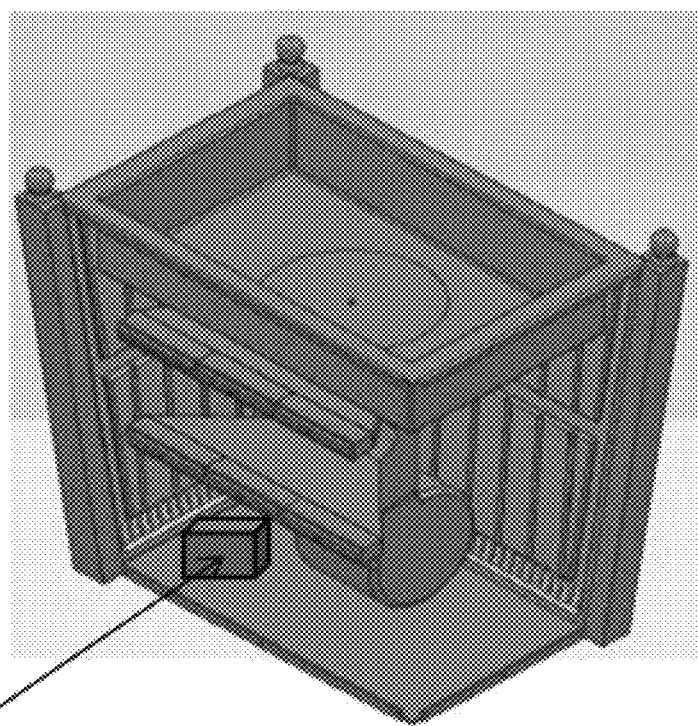
FIG. 2 illustrates an interior view of an embodiment of the disclosed apparatus. The figure illustrates a heating system that may be utilized.

The embodiment of the mosquito repelling apparatus depicted in FIG. 2 includes a heating system 700, The heating system may comprise a heater. The heater may be connected to separate ventilation ducts that then coalesce with the air exhaust vents 501 of the fan system 500. Thus, the fan system 500 will expel hot air. Alternatively, the heating system 700 may not be connected to the fan system 500, but rather the heating system will merely heat the ambient air of the interior of the apparatus. The heated air will be contained within the interior of the apparatus defined by the walls 200, the base 201, and the planting area component 100 that forms the top of the interior of the apparatus. In this type of embodiment, the fan system 500 will draw in the heated ambient air and expel such through the fan system air exhaust vents 501, without the need to connect the heating system 700 physically with the fan system.

An embodiment of the mosquito repelling apparatus will now be described with reference to FIG. 3.

Figure 3:
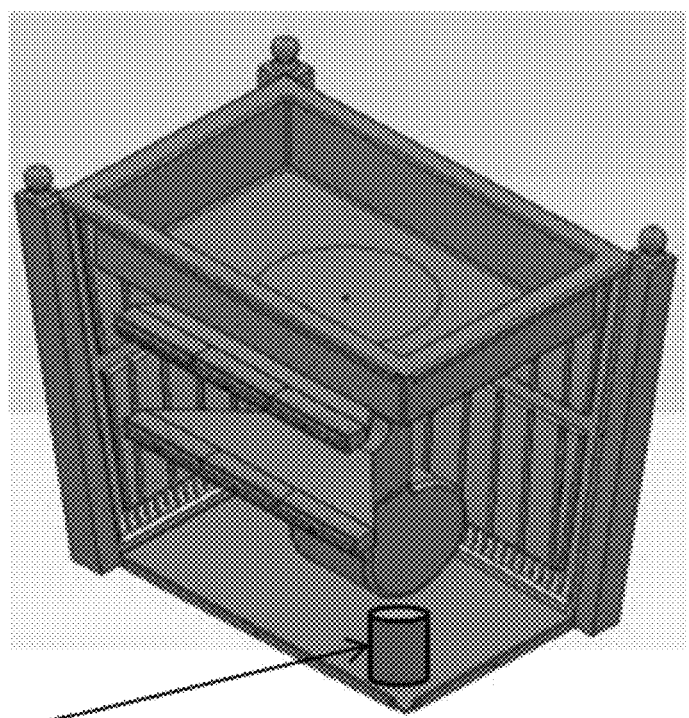
FIG. 3 illustrates an interior view of an embodiment of the disclosed apparatus. The figure illustrates a cooling system that may be utilized.

The embodiment of the mosquito repelling apparatus depicted in FIG. 3 includes a cooling system 800. The cooling system may comprise a compressor or any other apparatus for cooling air. The cooling system may be connected to separate ventilation ducts that then coalesce with the air exhaust vents 501 of the fan system 500. Thus, the fan system 500 will expel cold air, much like an air conditioner. Alternatively, the cooling system 800 may not be connected to the fan system 500, but rather the cooling system will merely cool the ambient air of the interior of the apparatus. The cooled air will be contained within the interior of the apparatus defined by the walls 200, the base 201, and the planting area component 100 that forms the top of the interior of the apparatus. In this type of embodiment, the fan system 500 will draw in the cooled ambient air and expel such through the fan system air exhaust vents 501, without the need to connect the cooling system 800 physically with the fan system.

The embodiment of the apparatus comprising a cooling system is especially useful in warm climates where there is a great need for outdoor air conditioning. Further, mosquitoes are often most active in warm climates where the air cooling capabilities of the apparatus disclosed herein would be beneficial.

Figure 4:
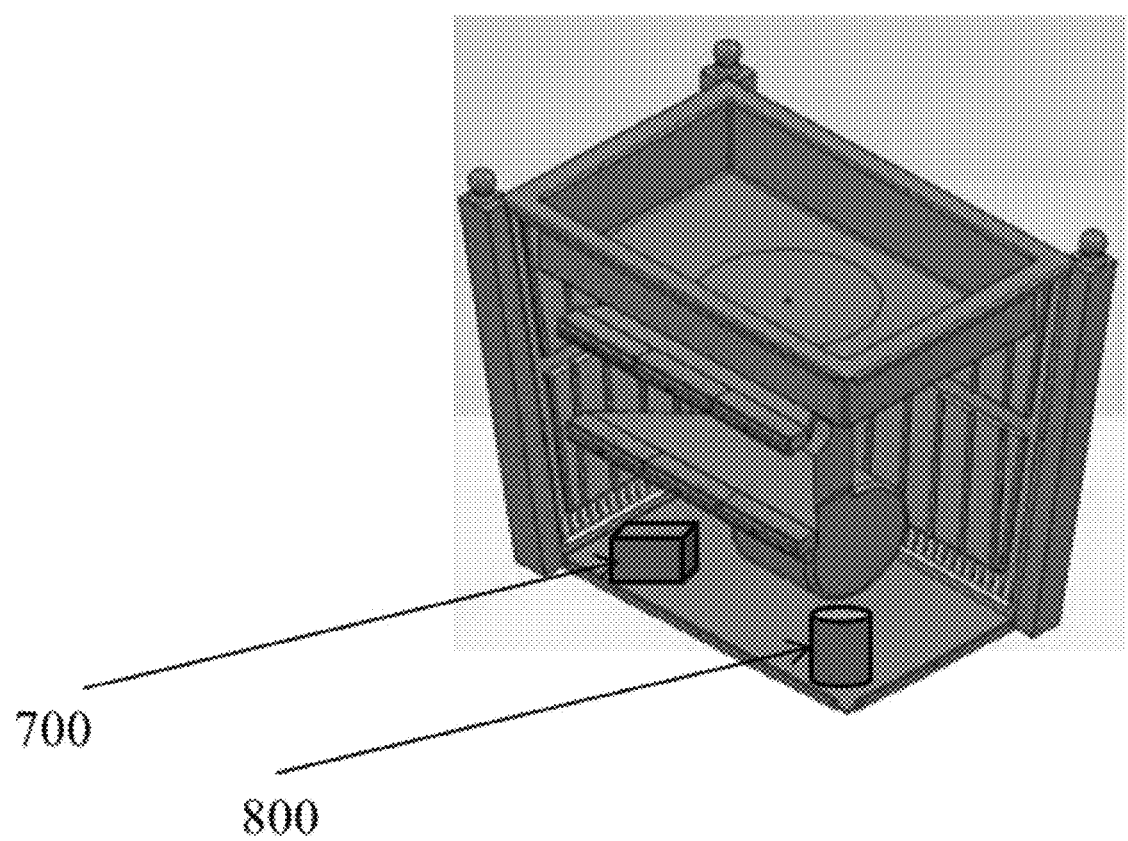
FIG. 4 illustrates an interior view of an embodiment of the disclosed apparatus. The figure illustrates a heating system and cooling system combination that may be utilized.

An embodiment of the mosquito repelling apparatus will now be described with reference to FIG. 4.

In this example, both a heating system 700 and cooling system 800 are provided.

Figure 5:
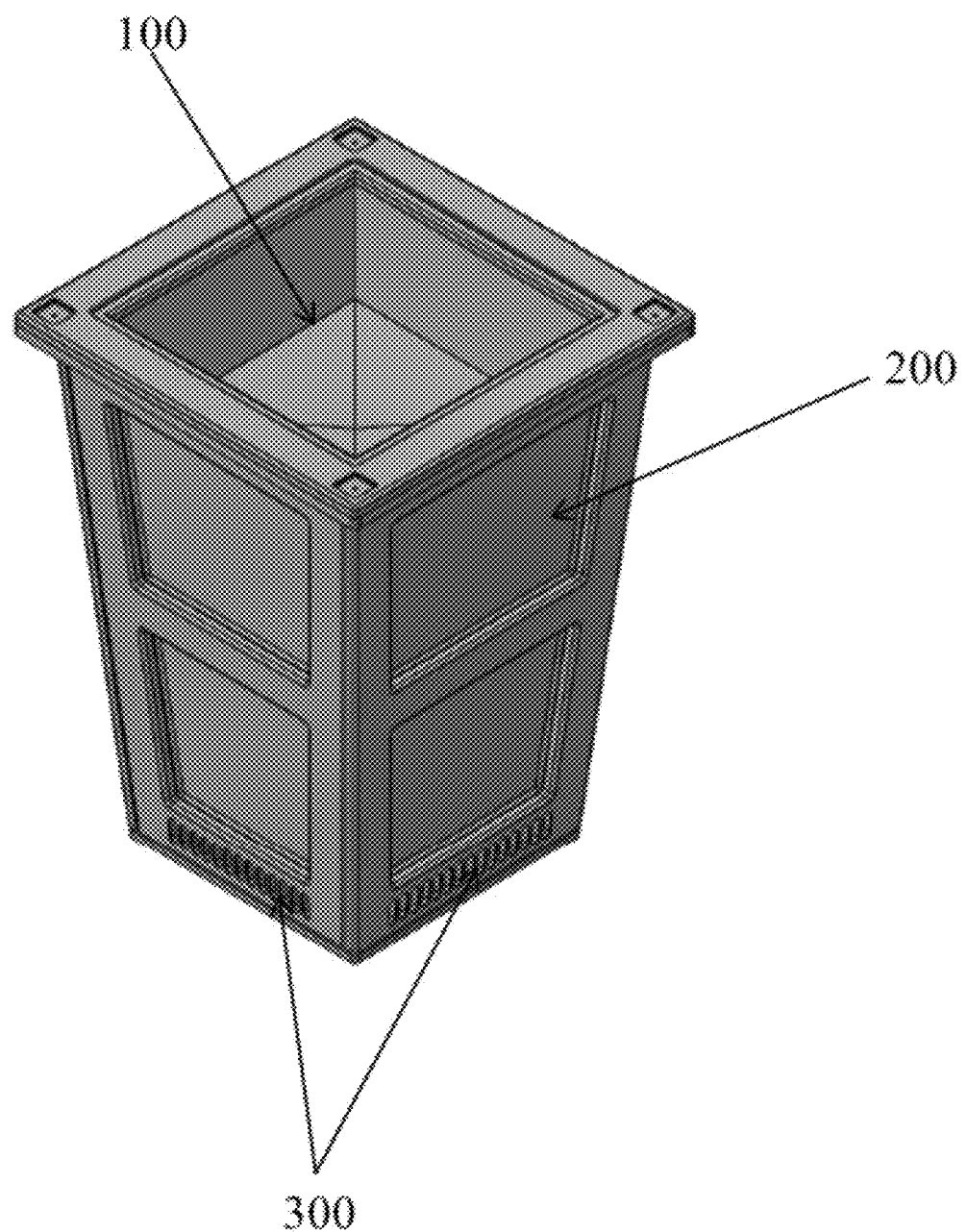
FIG. 5 illustrates a perspective view of the exterior of an embodiment of the disclosed apparatus.

An embodiment of the mosquito repelling apparatus will now be described with reference to FIG. 5.

In this example, the exterior of the planting area component 100, the walls 200, and the air intake vent apertures 300 are depicted.

Figure 6:
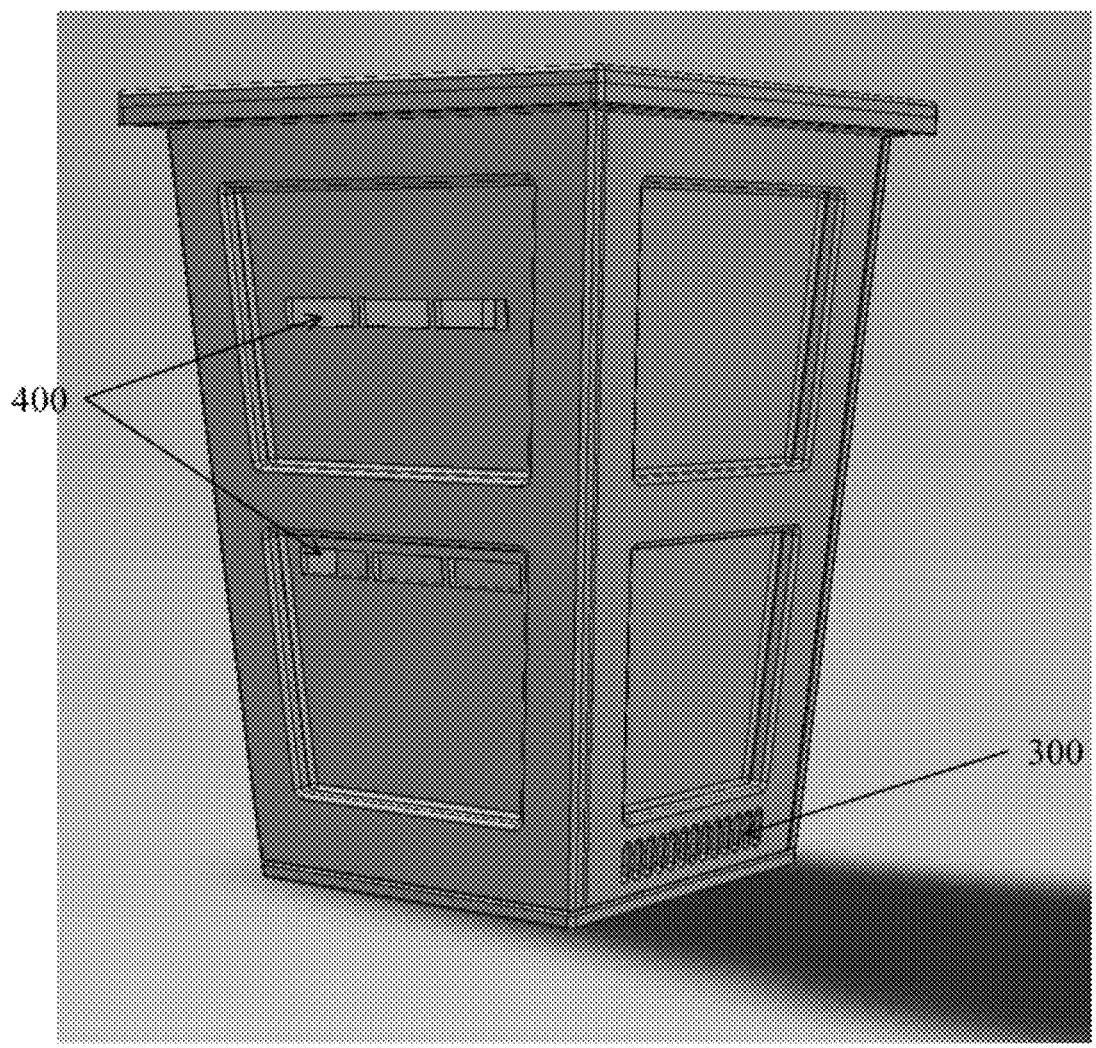
FIG. 6 illustrates a perspective view of the exterior of an embodiment of the disclosed apparatus. The figure illustrates the side wall of the apparatus that comprises the air exhaust vein apertures.

An embodiment of the mosquito repelling apparatus will now be described with reference to FIG. 6.

In this example, the air intake vent apertures 300 are depicted at the bottom of one wall 200. Also illustrated are the air exhaust vent apertures 400. The air exhaust vent apertures 400, in a preferred embodiment, are only located on one wall 200 (not numbered in this FIG.). In this preferred embodiment, the other three walls 200, do not contain air exhaust vent apertures. Further, the embodiment illustrated in FIG. 6 does not depict air intake vent apertures 300 at the bottom of the wall 200 that comprises the air exhaust vent apertures 400. However, as aforementioned with respect to the description of FIG. 1., it is contemplated that air intake vent apertures 300 may be located on each of the four walls 200 and even on the base 201 of the apparatus. It is contemplated that the fan system 500, and in particular the fan system air exhaust vents 501, as shown in previous FIGS., will discharge air out through the air exhaust vent apertures 400.

Figure 7:
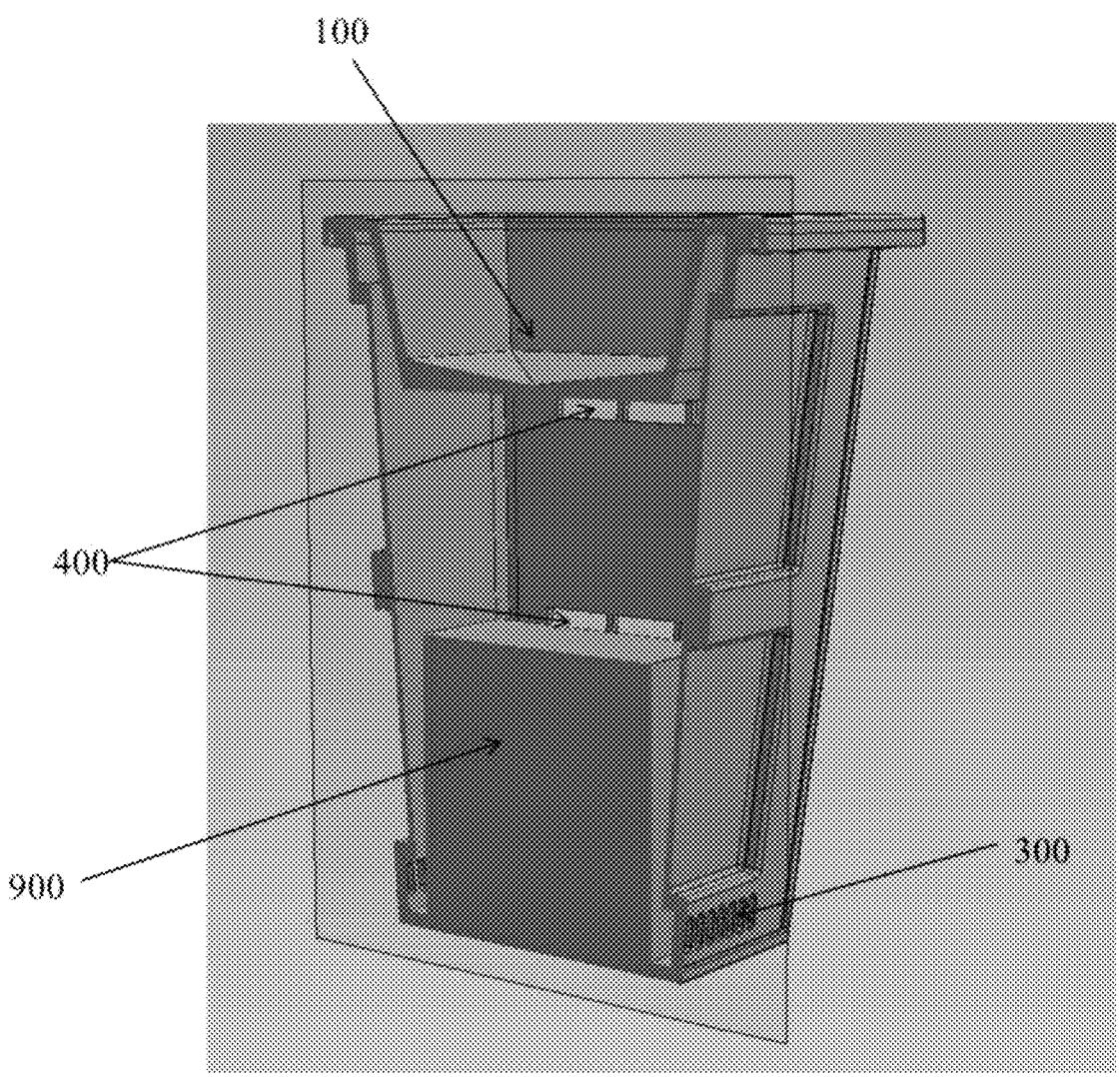
FIG. 7 illustrates a cross sectional view of an embodiment of the disclosed apparatus. The figure abstractly illustrates an environmental modulator, which may comprise a fan system, heating system, cooling system, and/or humidifying or dehumidifying system.

An embodiment of the mosquito repelling apparatus will now be described with reference to FIG. 7.

In this example, the cross section of an embodiment of the apparatus is depicted. The planting area component 100 can be seen to form the top most portion of the interior of the apparatus, which is further defined by the walls 200 and base 201 (not numbered in this FIG.). The air intake vent apertures 300 are illustrated at the bottom of the walls 200. The air exhaust vent apertures 400 can be seen through the cross sectional view. Also depicted in this embodiment is an environmental modulator 900. The environmental modulator 900 may comprise any type of apparatus capable of modulating ambient air temperature or humidity, e.g. a fan system, heating system, cooling system, humidifier, or dehumifier. Further, the environmental modular also contemplates embodiments in which a water supply is provided by the modulator that is then dispersed or "misted" into the surrounding environment through, for example, the air exhaust vent apertures 400. Thus, in some embodiments, the apparatus is capable of blowing (if a fan system 500, not numbered in this FIG., is also utilized) a mist out into the surrounding environment. This embodiment, is particularly useful in hot climates where cooling mist is enjoyable.

Figure 8:
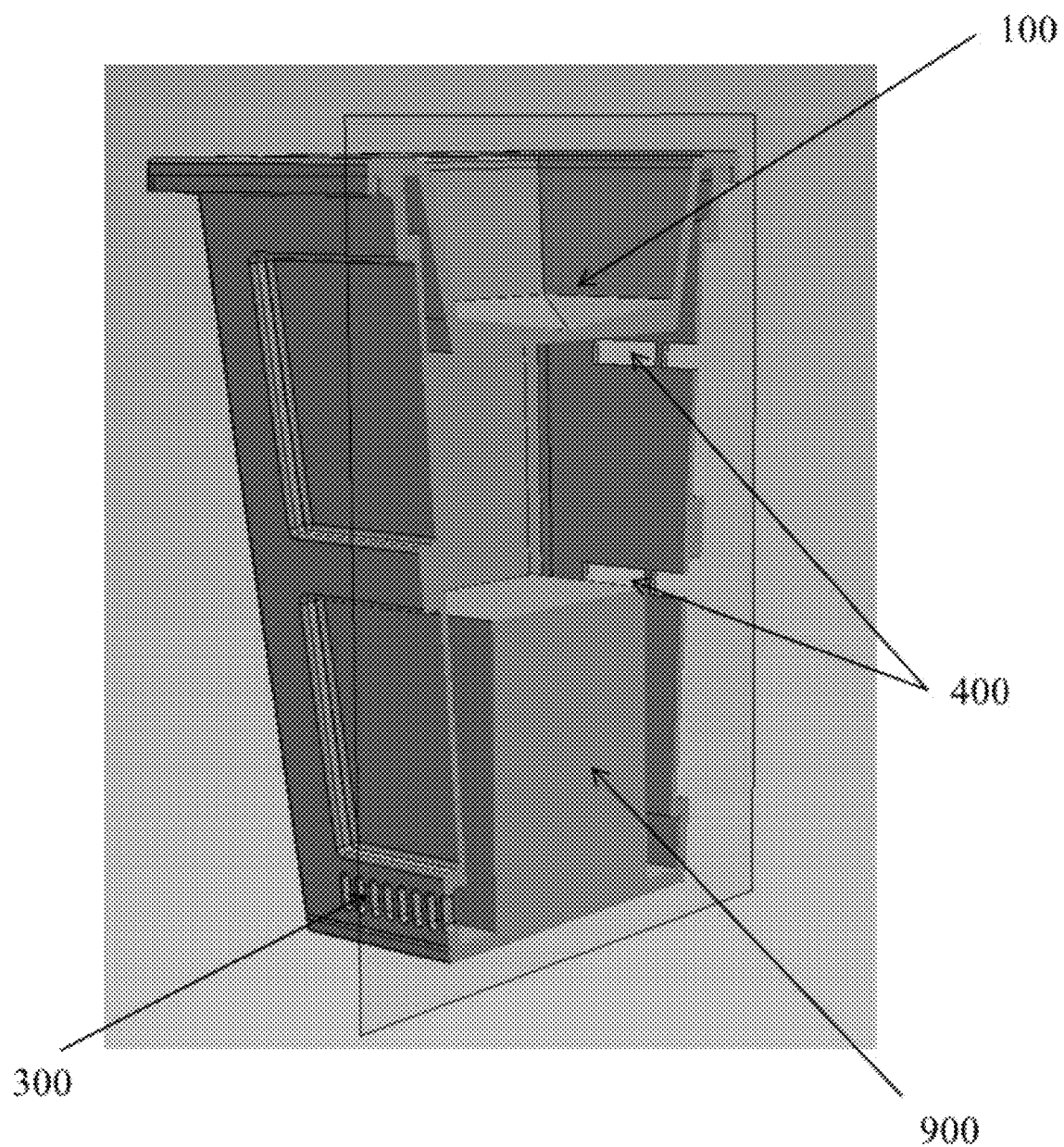
FIG. 8 illustrates another cross sectional view of an embodiment of the disclosed apparatus.

An embodiment of the mosquito repelling apparatus will now be described with reference to FIG. 8.

In this example, another cross section of an embodiment of the apparatus is depicted. The planting area component 100 can be seen to form the top most portion of the interior of the apparatus, which is further defined by the walls 200 and base 201 (not numbered in this FIG.). The air intake vent apertures 300 are illustrated at the bottom of the walls 200. The air exhaust vent apertures 400 can be seen through the cross sectional view. Also depicted in this embodiment, is an environmental modulator 900.

Figure 9:
FIG. 9 illustrates an embodiment of the disclosed apparatus on a sun deck.

An embodiment of the mosquito repelling apparatus will now be described with reference to FIG. 9, which illustrates an embodiment of the apparatus located outdoors on a sun deck.

Figure 10:
FIG. 10 illustrates an embodiment of the disclosed apparatus on a sun deck and next to an outdoor chair.

An embodiment of the mosquito repelling apparatus will now be described with reference to FIG. 10, which illustrates an embodiment of the apparatus located outdoors on a sun deck and next to an outdoor chair. Other embodiments of the apparatus are much larger, but the relative proportion of the top to the bottom is approximately constant.

Figure 11:
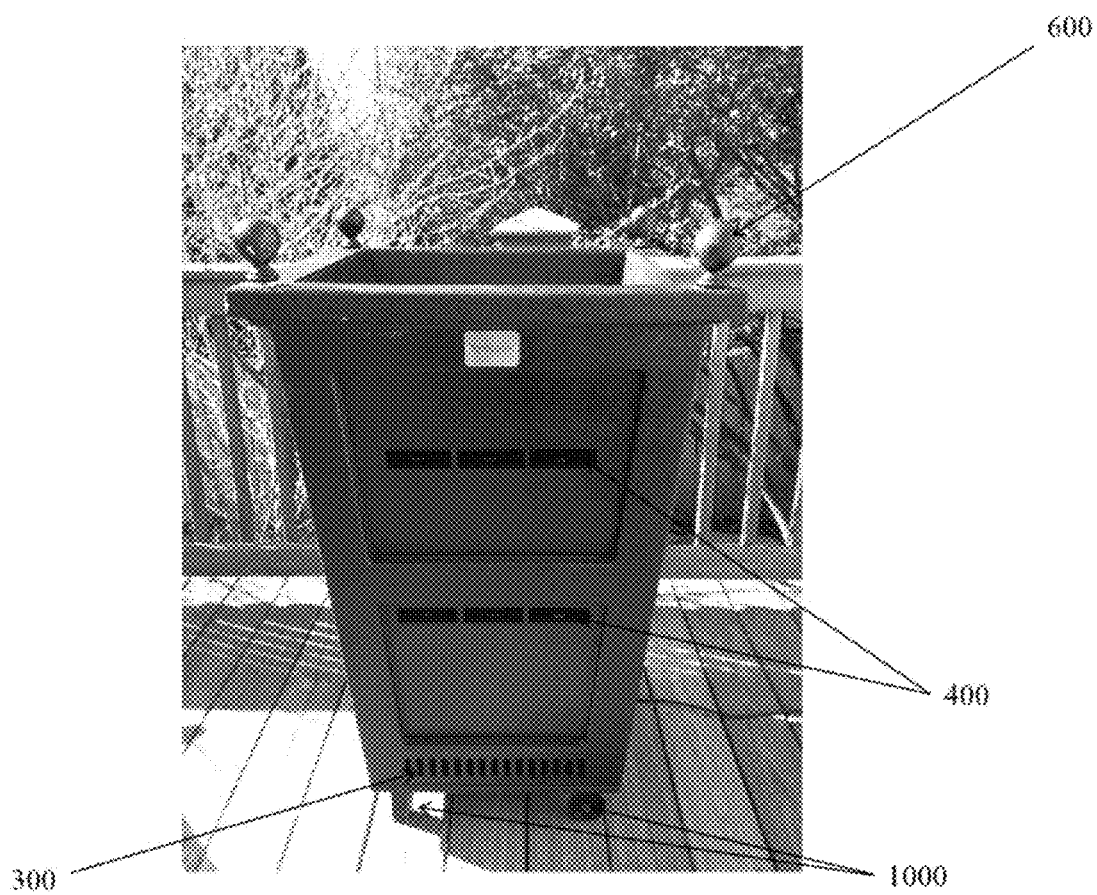
FIG. 11 illustrates an embodiment of the disclosed apparatus on a sun deck. The figure illustrates the side wall of the apparatus that comprises the air exhaust vent apertures.

An embodiment of the mosquito repelling, apparatus will now be described with reference to FIG. 11.

In this example, the lighting component 600 is present. Further, the air exhaust vent apertures 400 are depicted on one wall 200 of the apparatus. The air intake vent apertures 300 can be seen located at the bottom of the wall 200 (not numbered) that also comprises the air exhaust vent, apertures 400. As aforementioned, the air intake vent apertures 300 can be located on each of the four walls 200. In a preferred embodiment, the air intake vent apertures 300 are located at the bottom of each of the four walls 200 and the air exhaust vent apertures 400 are only located on a single wall 200. This example also comprises a component for support and/or movement 1000. The component for support and/or movement 1000 is depicted in this example as a wheel on one side of the apparatus and a support post on the other. This particular arrangement allows the apparatus to be tilted to one side and easily rolled when the apparatus needs to be moved.

Figure 12:
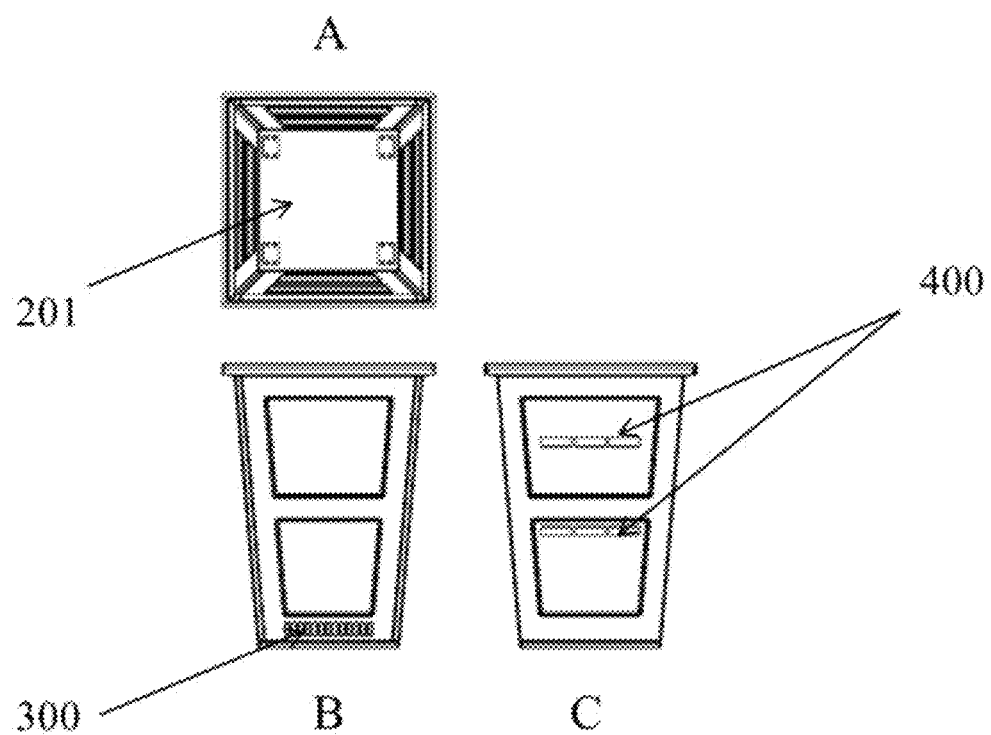
FIG. 12 illustrates in panel to a bottom view of an embodiment of the disclosed apparatus. Panel (B) illustrates a side view. Panel (C) illustrates the side wall of the apparatus that comprises the air exhaust vent apertures.

FIG. 12 illustrates in panel (A) an exterior bottom view of an embodiment of the disclosed apparatus showing the base 201. Panel (B) illustrates a side view showing the air intake vent apertures 300. Panel (C) illustrates the side wall of the apparatus that comprises the air exhaust vent apertures 400.

An embodiment of the mosquito repelling apparatus will now be described with reference to FIG. 13.

In this example, the top planting, area component 100 is shown. The planting area component 100 may be removable from the containment component that comprises the walls 200 and base 201. Or, as aforementioned, the planting area component may be permanently affixed to the body of the apparatus, as defined by the walls 200 and base 201 of the containment component. This example illustrates the planting area component 100 removed from the body of the apparatus. The example also illustrates a drainage hose 102. The drainage hose 102 allows water from the planting area component 100 to flow out of the component, thus ensuring that the internal apparatus components are not affected by water that may be used for plants in the planting area component 100. Water is able to flow out of the planting area component 100 and thru the drainage hole 101 not numbered in this FIG.) and into the drainage hose 102, which carries the water to the outside of the apparatus.

Figure 14:
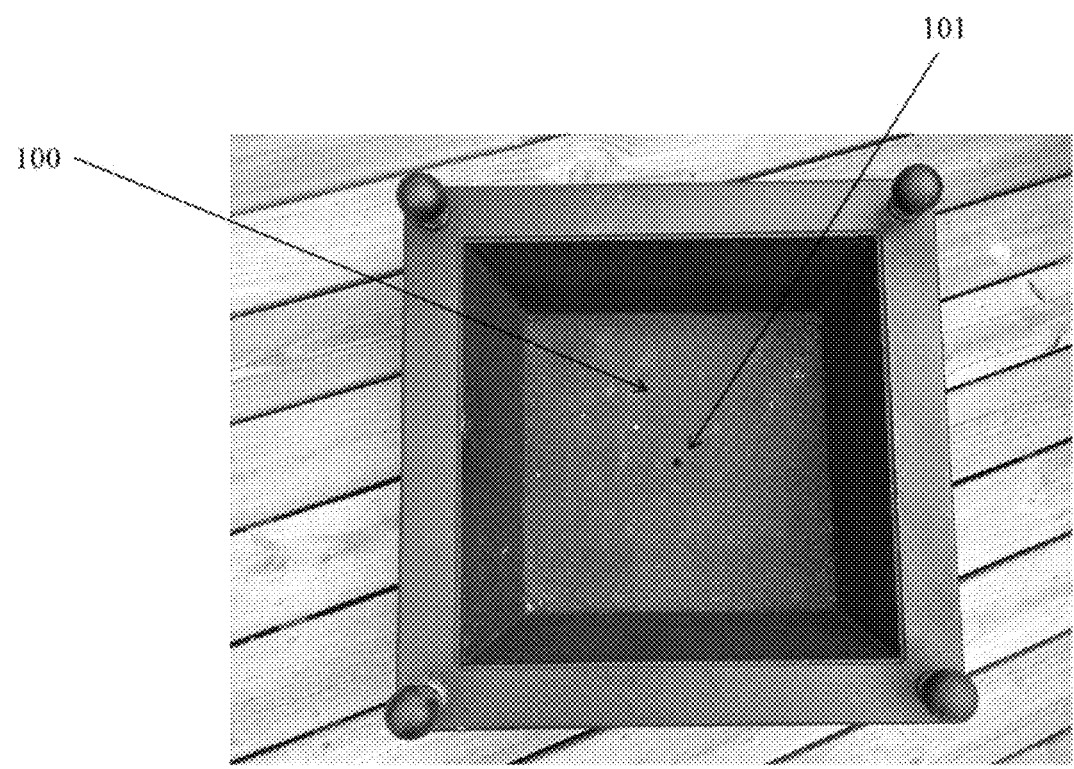

An embodiment of the mosquito repelling apparatus will now be described with reference to FIG. 14.

Figure 13:
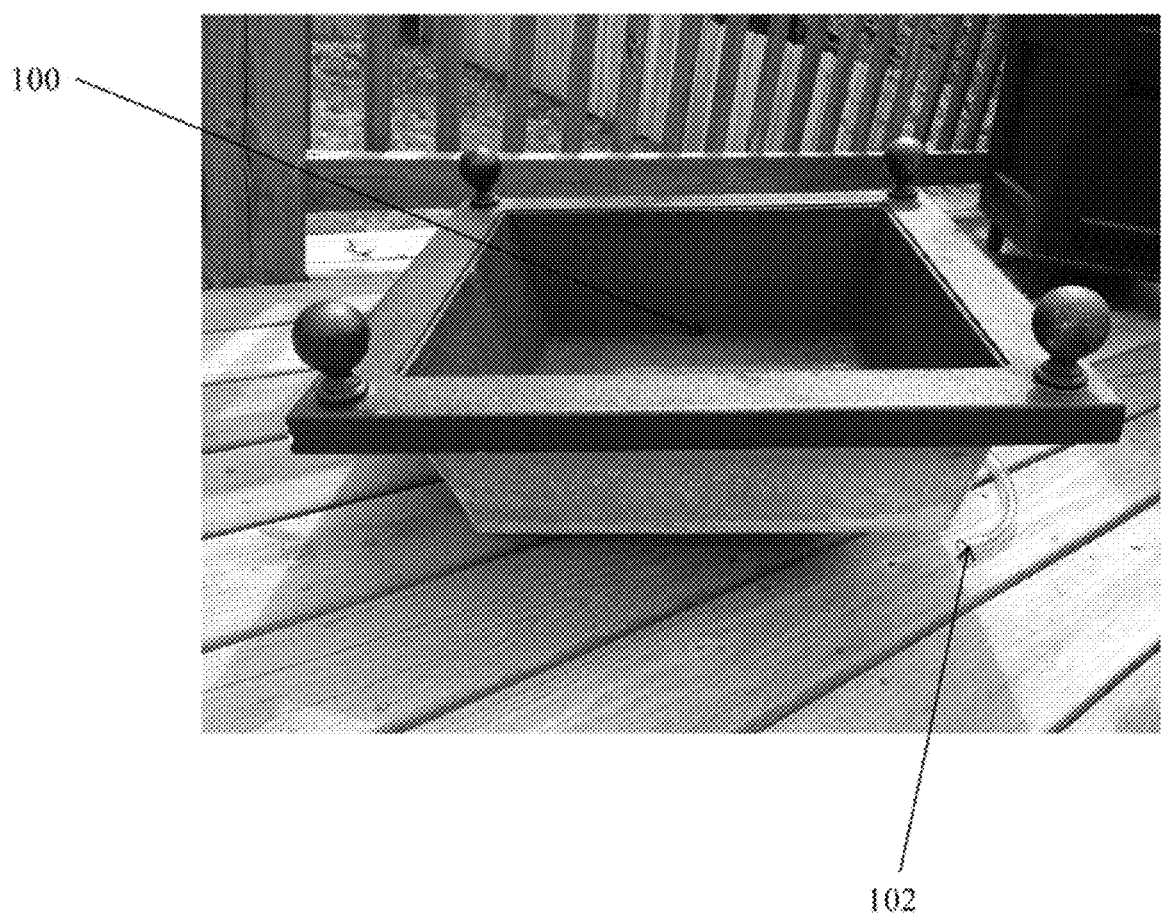
FIG. 13 illustrates the top planting area component of an embodiment of the disclosed apparatus. The top planting area component of the apparatus has been removed from the body of the apparatus, which is depicted in FIG. 16. The figure also illustrates a drainage hose that can be connected to the planting area component.

This example illustrates a top view of the top planting area component 100 of an embodiment of the disclosed apparatus, as presented in FIG. 13. The figure also illustrates a drainage hole 101 that the drainage hose 102 is able to connect with, in order to safely drain water out of the planting area component 100 without harming any electronic internal components of the apparatus.

Figure 15:
FIG. 15 illustrates a side view of the top planting area component of an embodiment of the disclosed apparatus, as presented in FIG. 13.

An embodiment of the mosquito repelling apparatus will now be described with reference to FIG. 15.

This example illustrates a side view of the top planting area component 100 that has been removed from the body of the apparatus, as defined by the walls 200 and base 201 of the containment component. The drainage hose 102 is depicted as connecting with the drainage hole 101 thru the utilization of a coupling means for attaching the drainage hose 102 to the drainage hole 101.

Figure 16:
FIG. 16 illustrates an embodiment of the disclosed apparatus with the top planting, area component removed from the body of the apparatus. The top planting area component is depicted in FIGS. 13-15.
Figure 17:
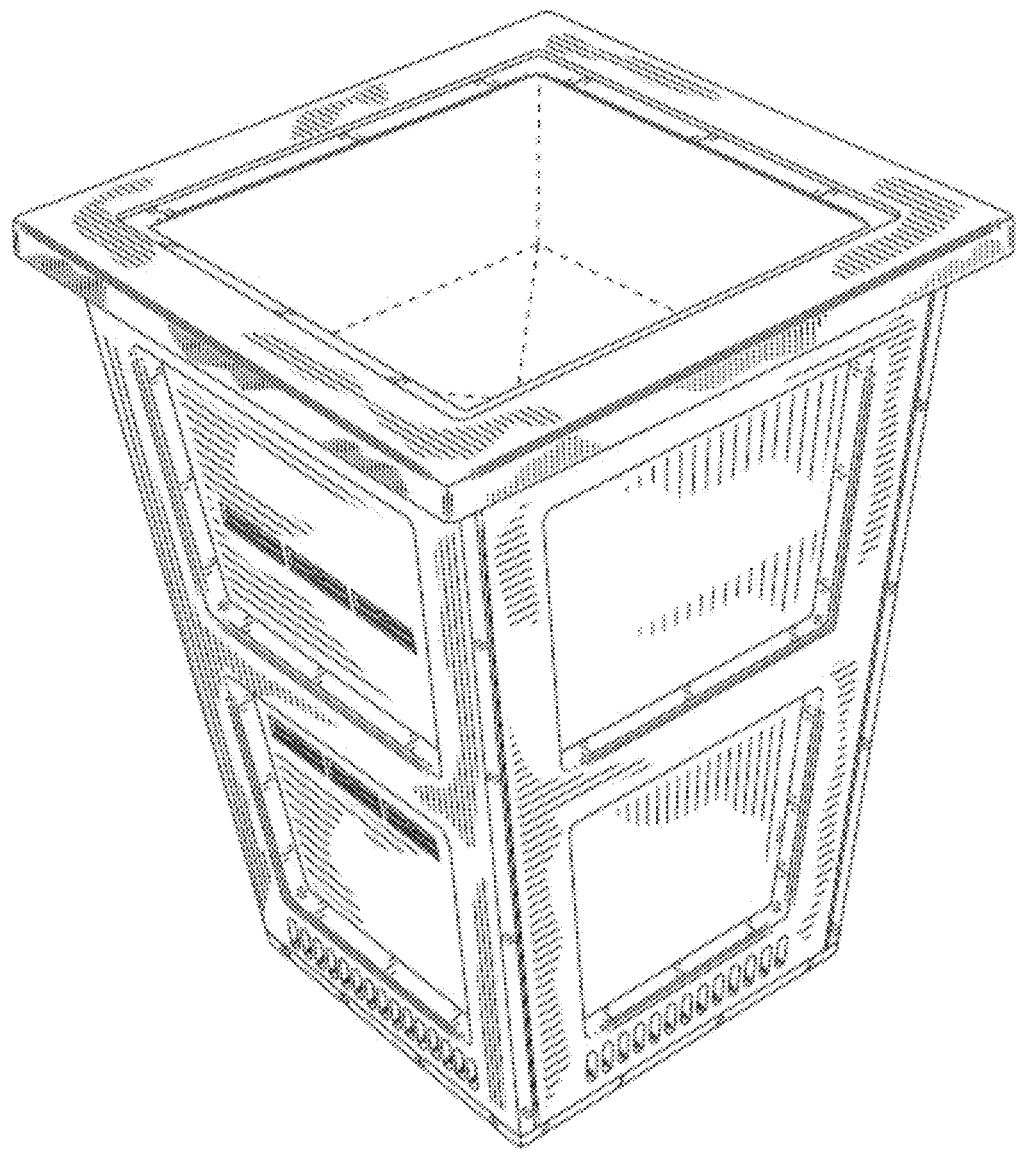
FIG. 17 illustrates a perspective view of an embodiment of the apparatus.
Figure 18:
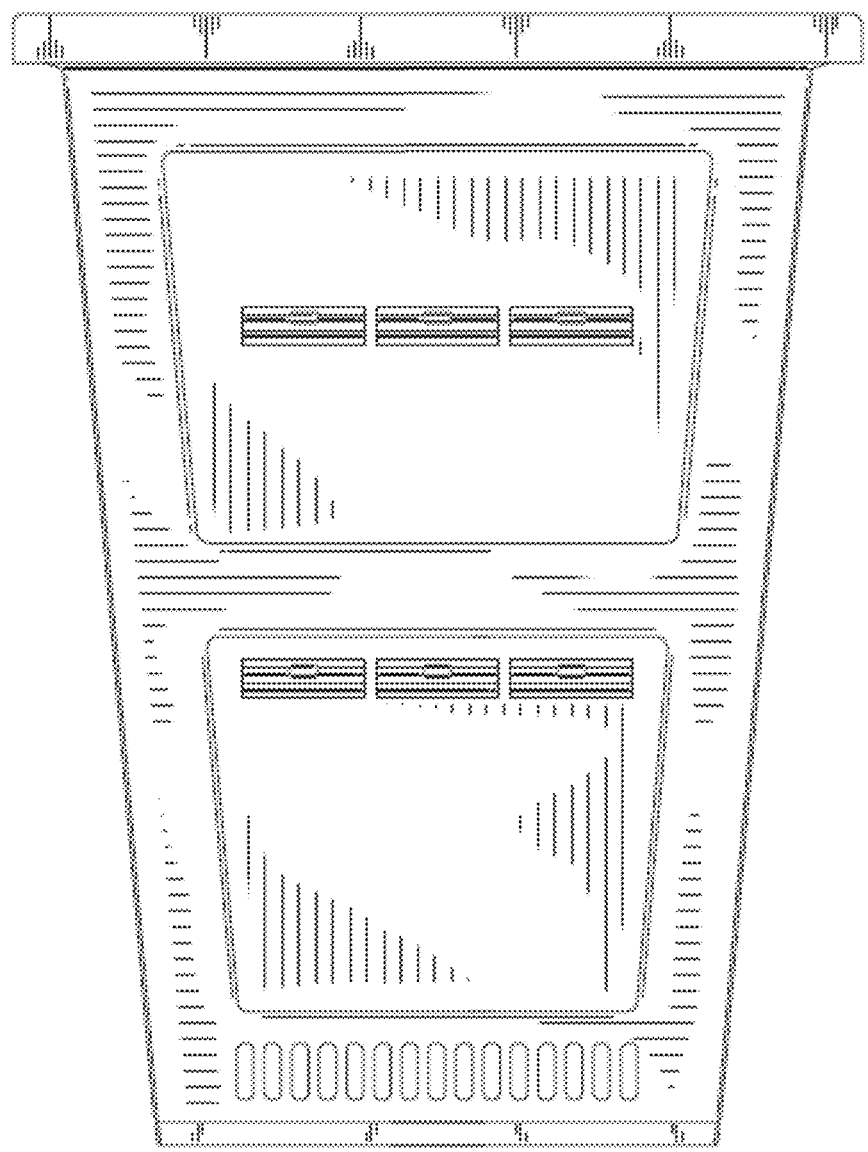
FIG. 18 illustrates a front view of an embodiment of the apparatus.
Figure 19:
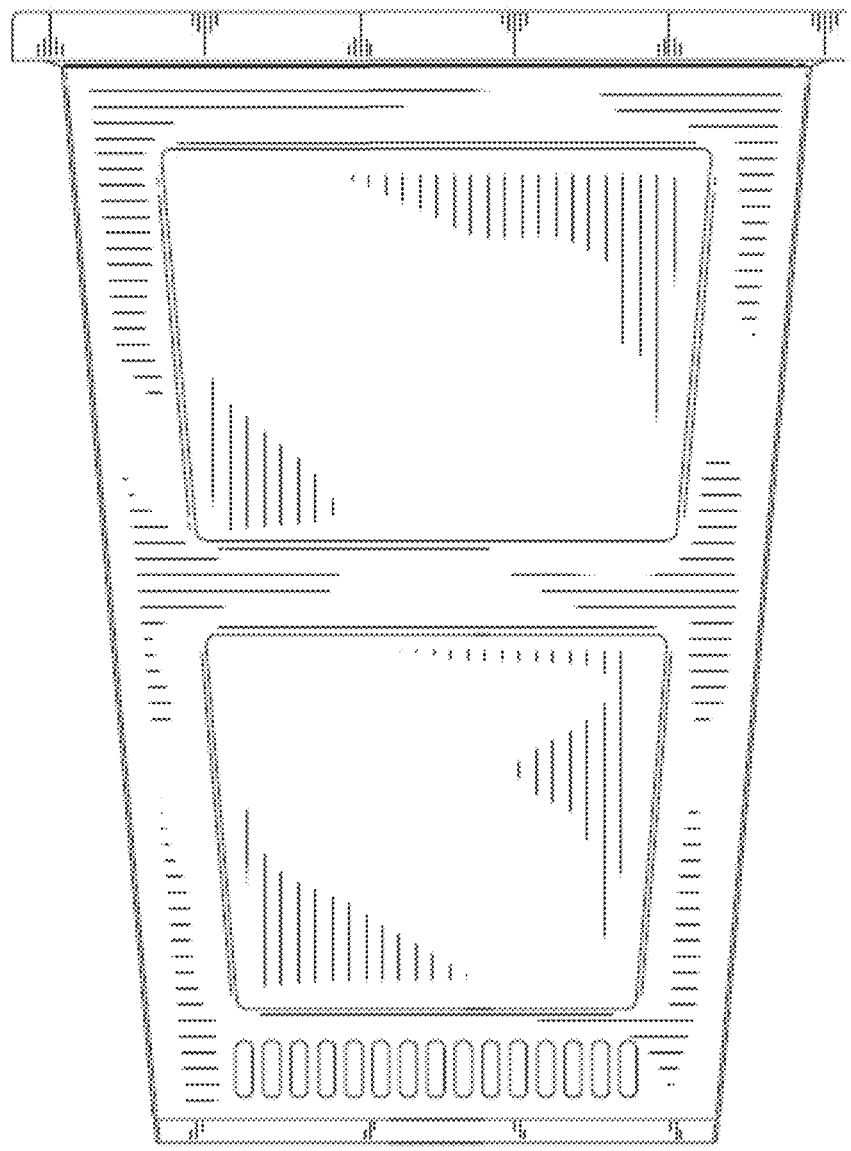
FIG. 19 illustrates a back view of an embodiment of the apparatus.
Figure 20:
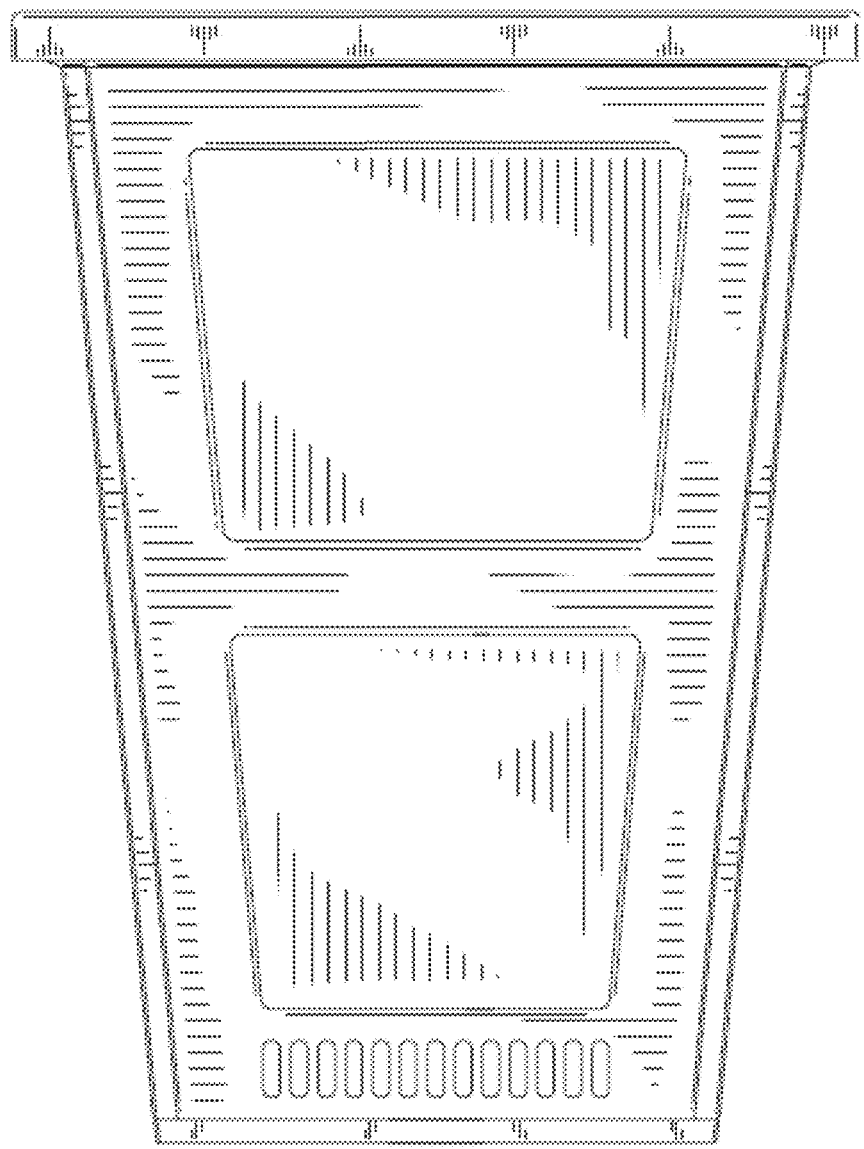
FIG. 20 illustrates a left view of an embodiment of the apparatus.
Figure 21:
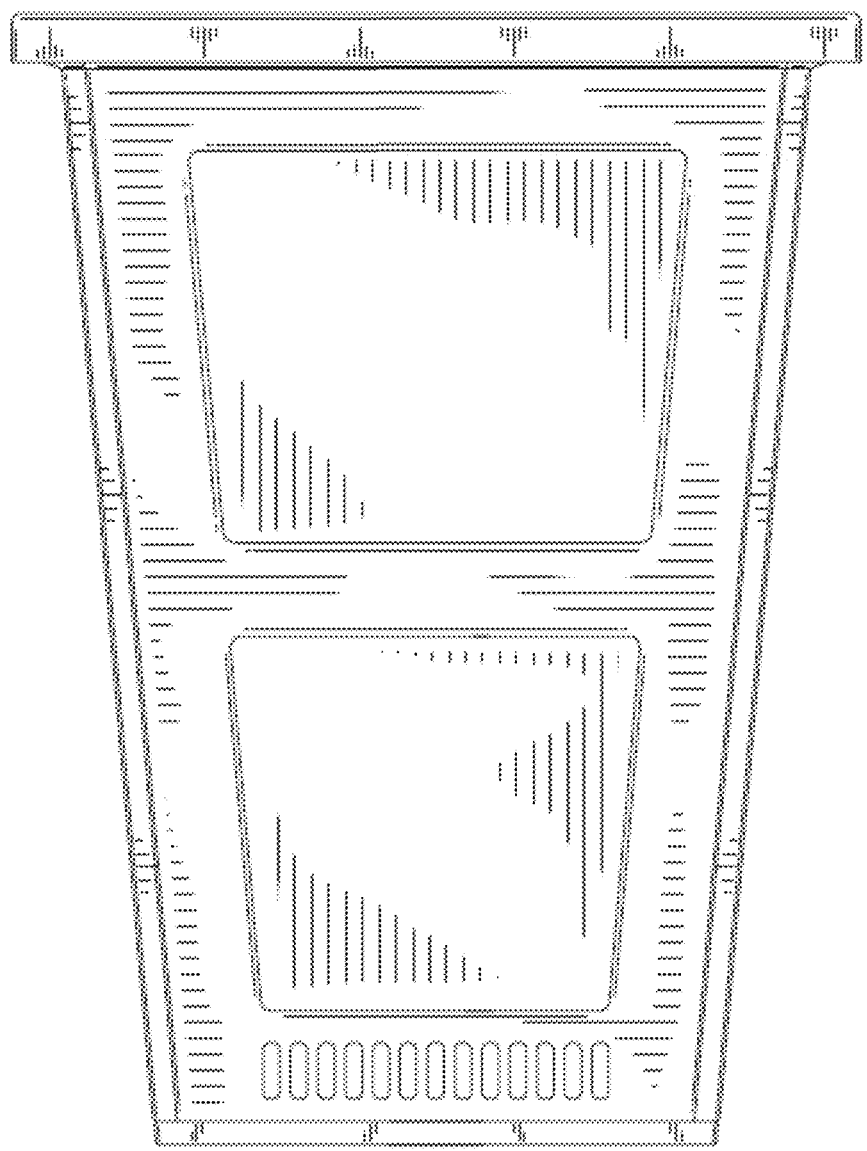
FIG. 21 illustrates a right view of an embodiment of the apparatus.
Figure 22:
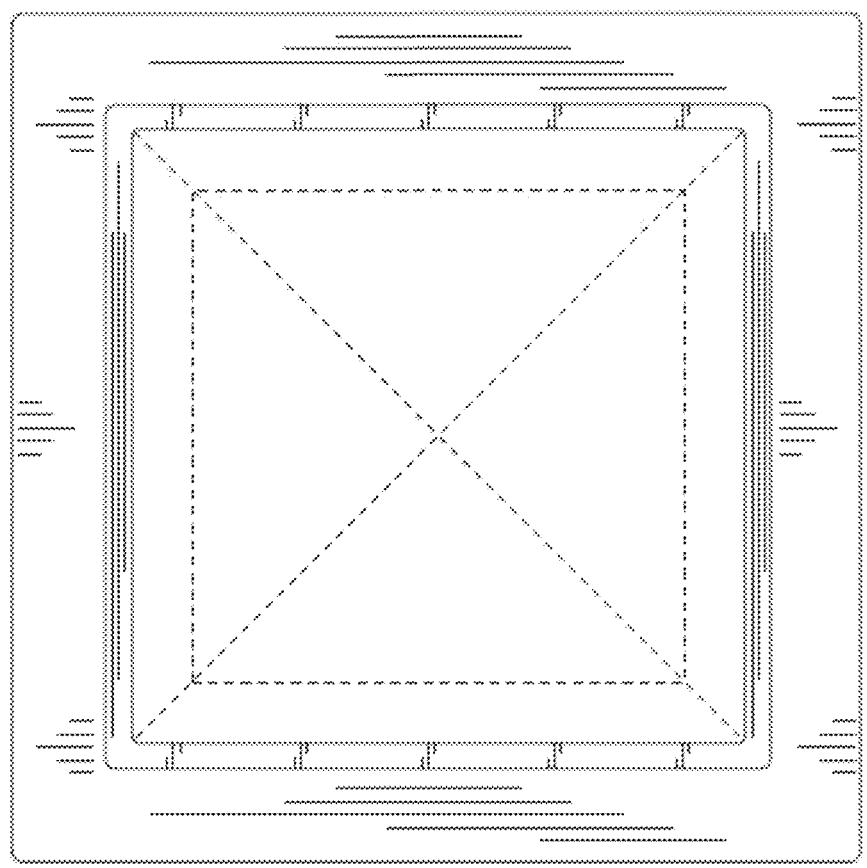
FIG. 22 illustrates a top down view of an embodiment of the apparatus.
Figure 23:
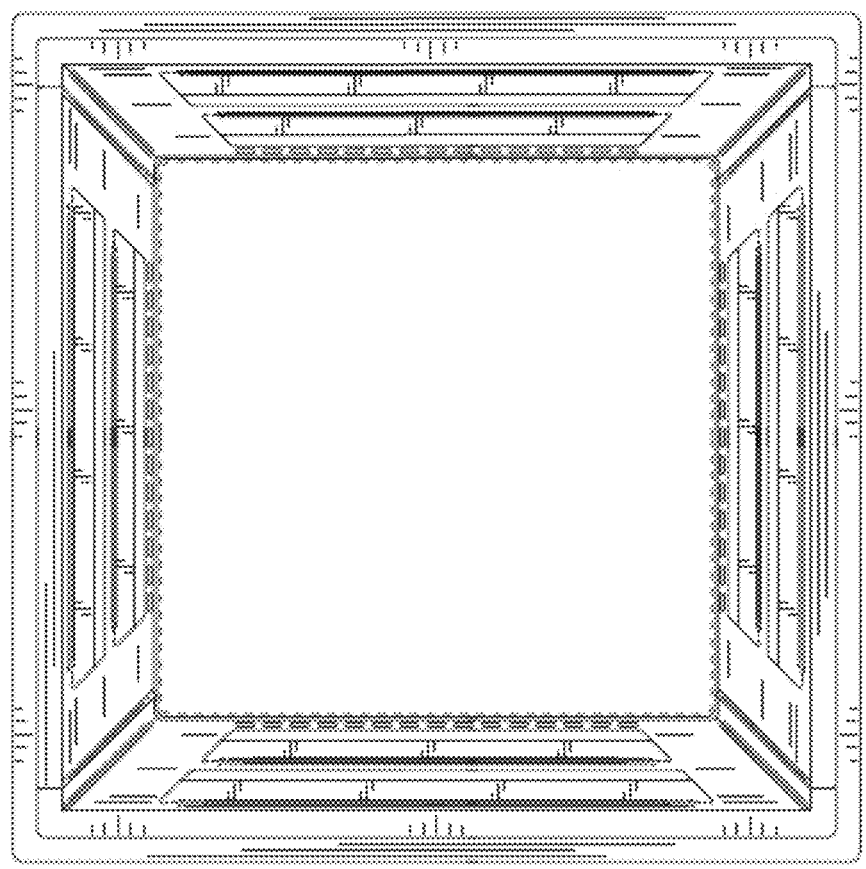
FIG. 23 illustrates a bottom view of an embodiment of the apparatus.
Figure 24:
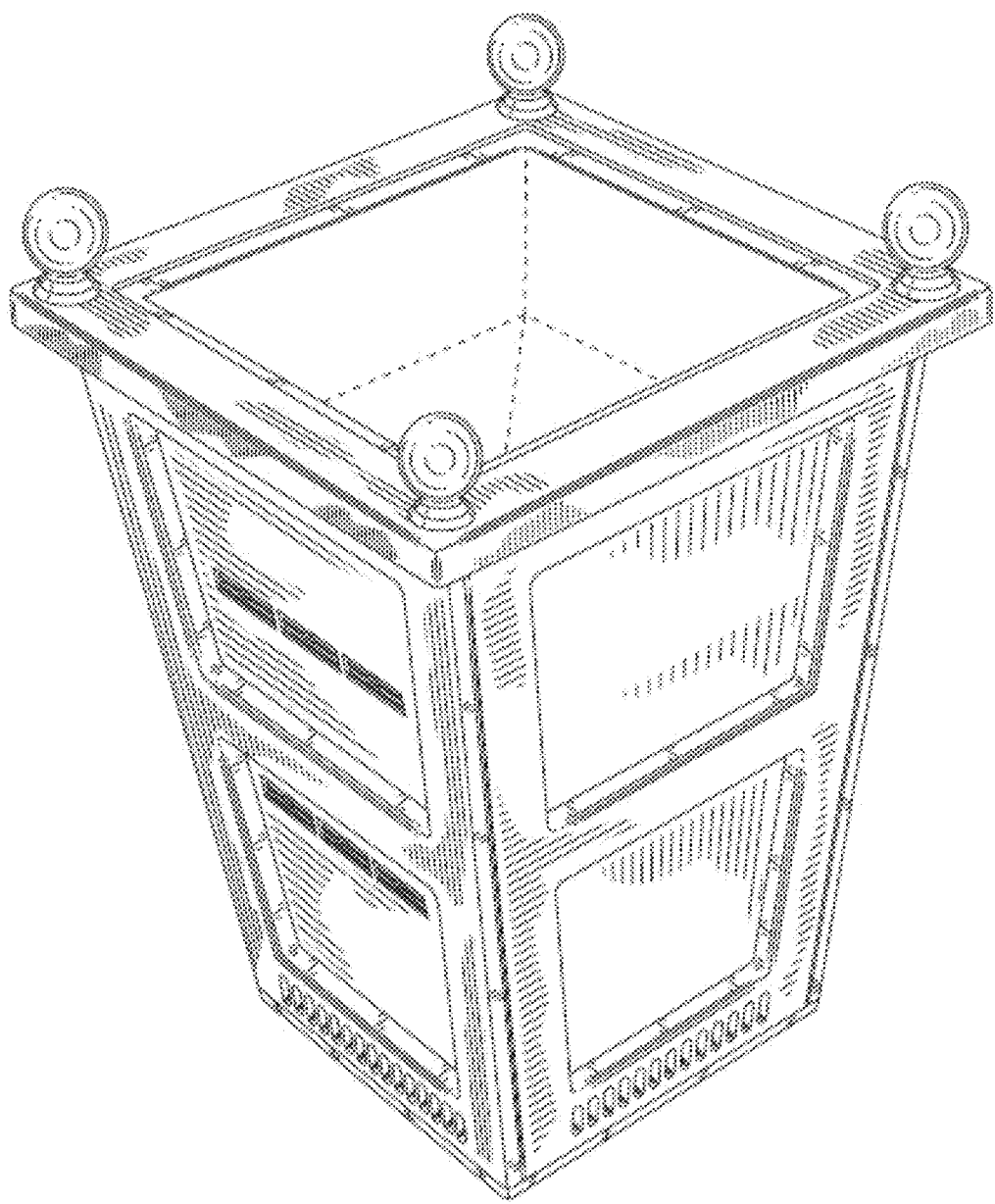
FIG. 24 illustrates a perspective view of an embodiment of the apparatus.
Figure 25:
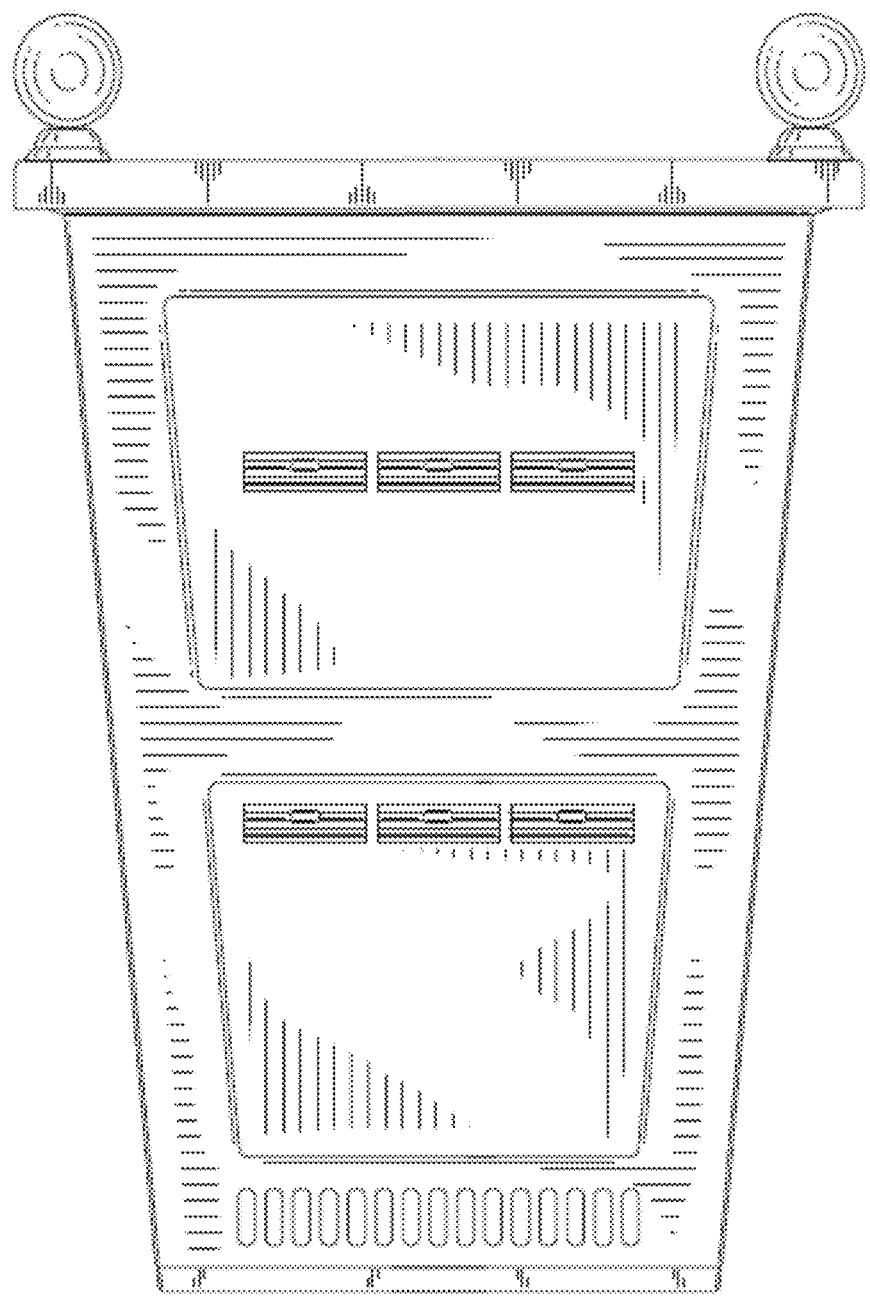
FIG. 25 illustrates a front view of an embodiment of the apparatus.
Figure 26:
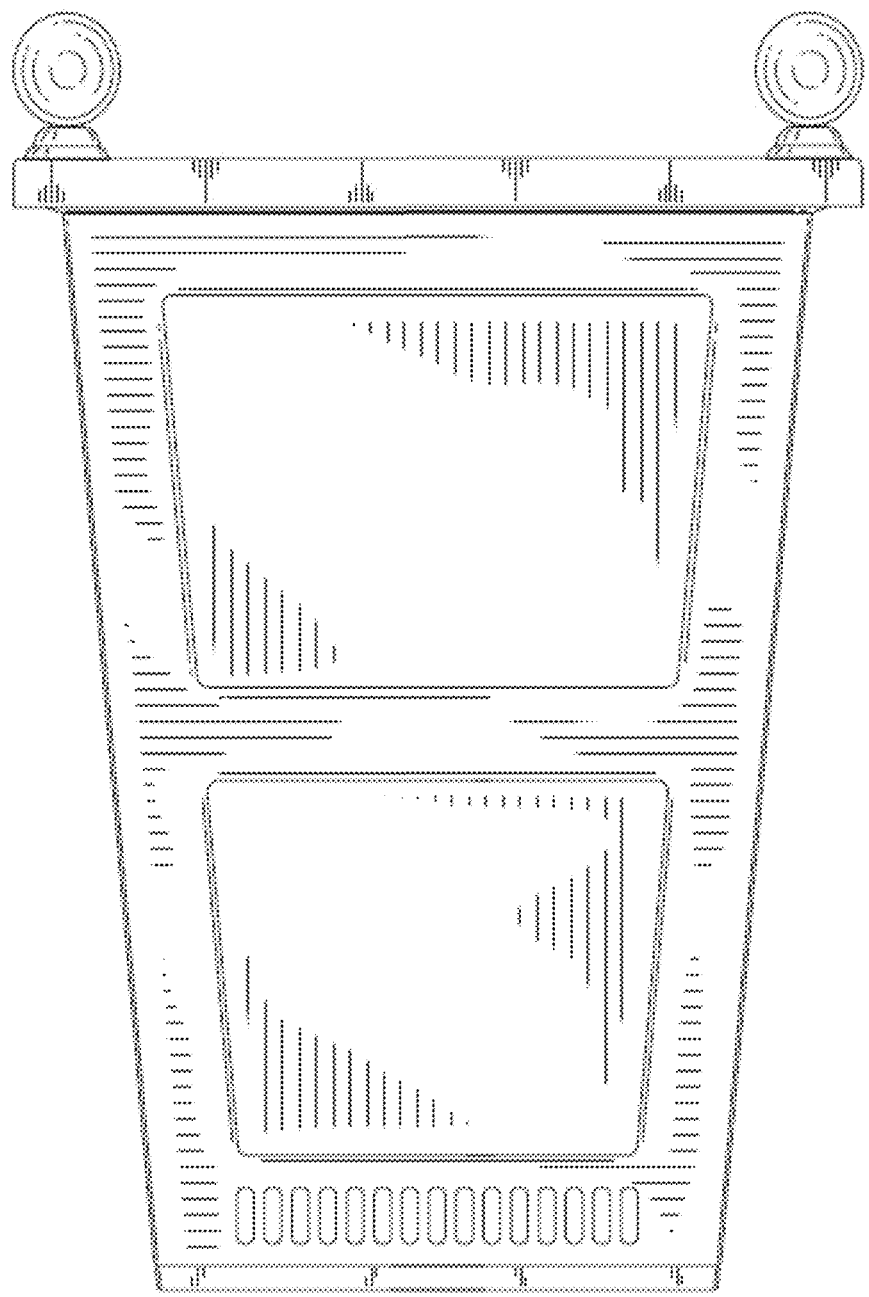
FIG. 26 illustrates a back view of an embodiment of the apparatus.
Figure 27:
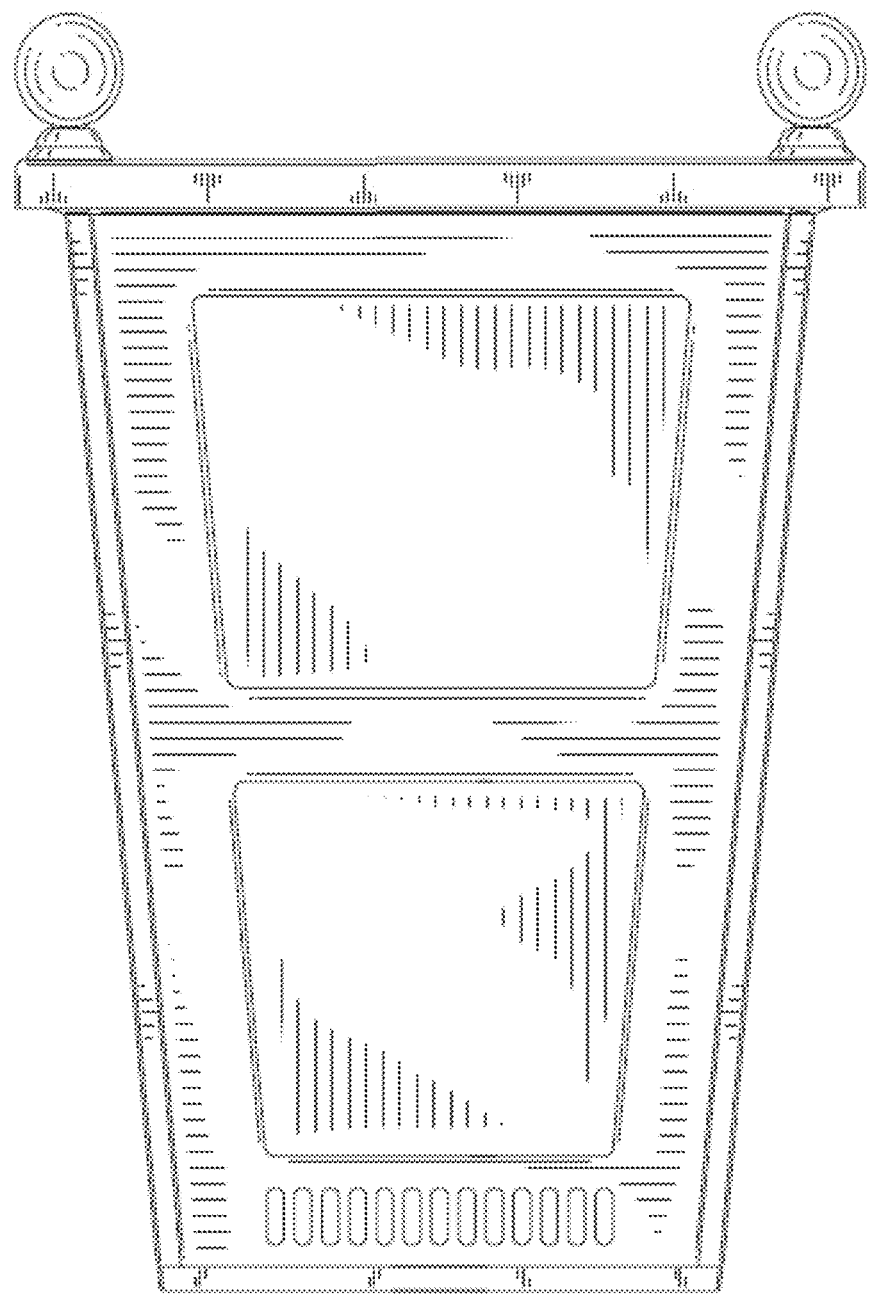
FIG. 27 illustrates a left view of an embodiment of the apparatus.
Figure 28:
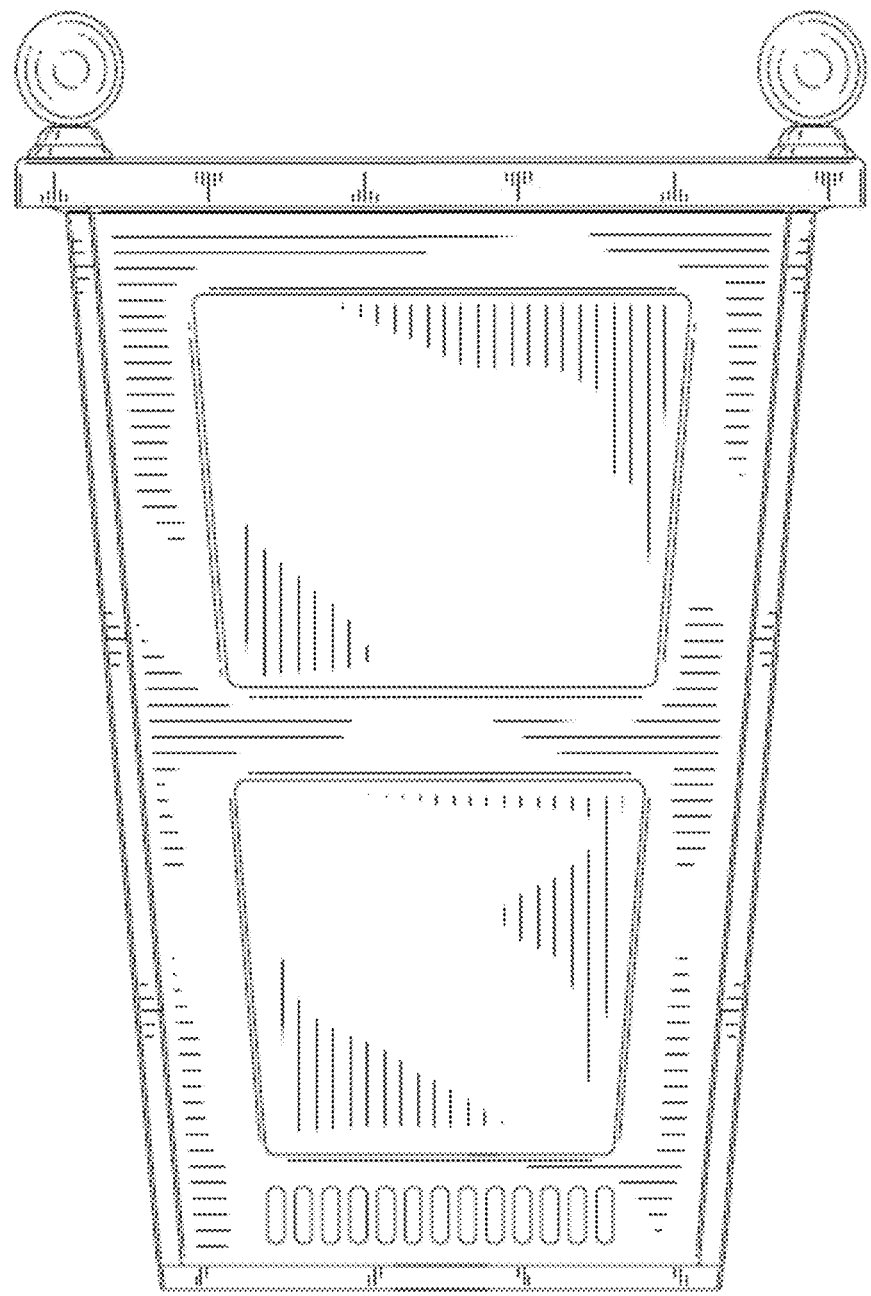
FIG. 28 illustrates a right view of an embodiment of the apparatus.
Figure 29:
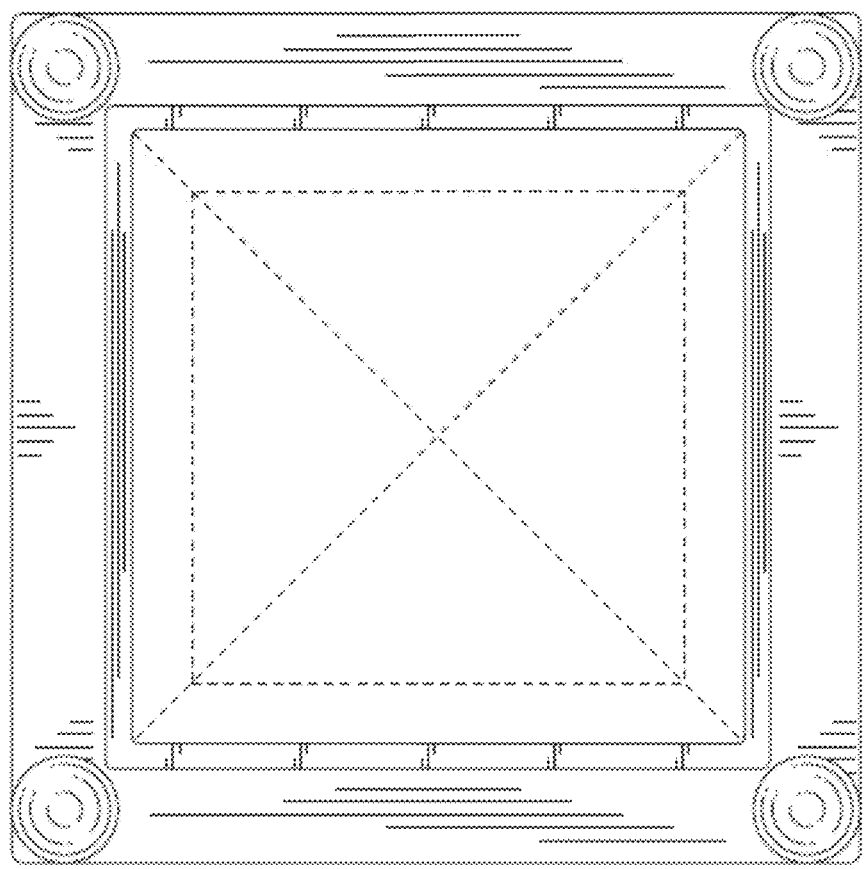
FIG. 29 illustrates a top down view of an embodiment of the apparatus.
Figure 30:
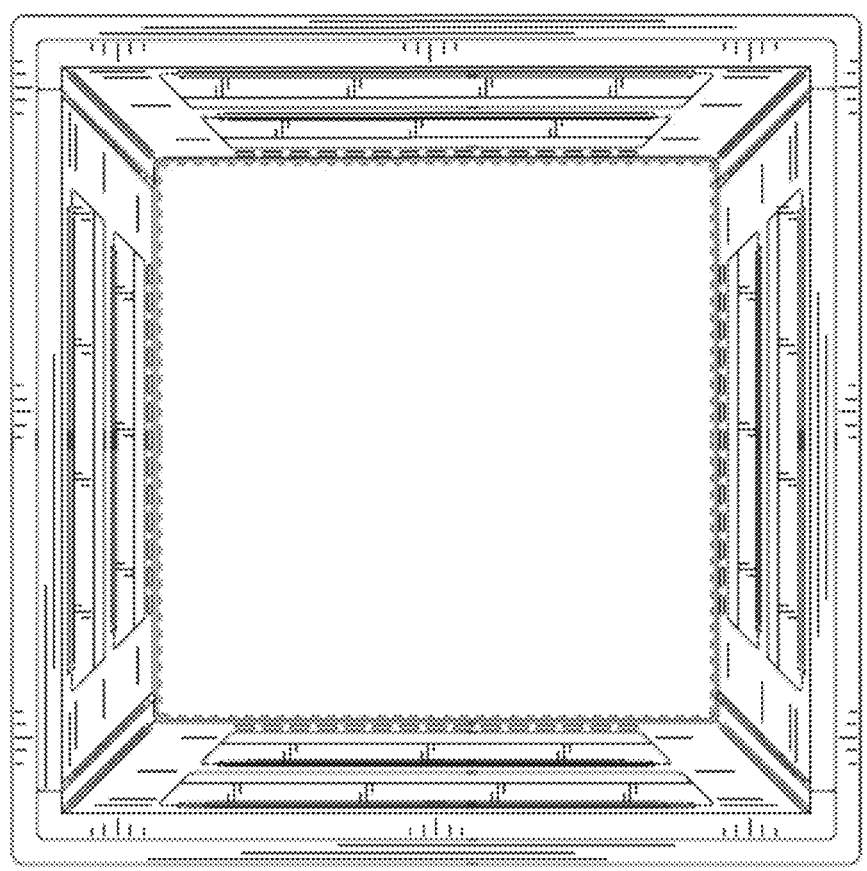
FIG. 30 illustrates a bottom view of an embodiment of the apparatus.

An embodiment of the mosquito repelling apparatus will now be described with reference to FIG. 16.

This example illustrates an embodiment of the disclosed apparatus with the top planting area component 100 removed from the body of the apparatus.

FIG. 17-30 illustrate further embodiments of the taught apparatus.

The present apparatus may comprise all of the variously disclosed components, as well as additional components. The present apparatus may also consist essentially of only those components specifically recited. Furthermore, the apparatus may only consist of specifically recited components and therefore exclude any additional components.

Specific mention of components that can be excluded in some aspects of the apparatus are: chemical repellant agents. Thus, in embodiments, chemical repelling agents and devices are specifically excluded, from being incorporated into the apparatus.

Thus, in an embodiment, the apparatus disclosed herein is able to effectively repel mosquitoes without the use of a chemical agent.

However, other embodiments of the apparatus do utilize chemical agents.

A. Mechanical Mosquito Repellant Ability of the Apparatus

The fan system described in various embodiments of the apparatus is able to effectively repel mosquitoes through the mechanical action of wind. As set forth above, "wind" refers to the artificial air current and air movement that is created by the fan system.

It is known that wind speeds above a certain threshold are capable of reducing a mosquito population in a given area, i.e. repelling the mosquitoes from the area. Specifically, wind speeds of approximately 4 miles per hour or 1.8 meters per second are known to significantly inhibit mosquito flight ability.[1]

[1] See M. T. Gillies & T. J. Wilkes, Field experiments with a wind tunnel on the flight speed of some west African mosquitoes (Diptera: Culicade), *Bulletin of Entomological Research*, Vol, 71, Issue 01, March 1981, pages 65-70; and Eric J. Hoffmann & James R, Miller, Reassessment of the Role and Utility of Wind in Suppression of Mosquito (Diptera: Culicidae) Host Finding: Stimulus Dilution Supported Over Flight Limitation, *Journal of Medical Entomology*, Vol. 40, issue 5. 2003, pages 607-614.

Wind is able to repel mosquitoes by affecting the insect's ability to fly and land on a target. Further, wind is able to effectively disperse $CO_2$ away from an area $CO_2$ is a known attractant for mosquitoes. Wind also disperses lactic acid, which is another known mosquito attractant. Thus, by inundating an area with wind of a sufficient speed, the disclosed apparatus is able to repel mosquitoes by at least three mechanisms: (n disrupting the insect's ability to fly and land on a target. (2) dispersing $CO_2$ attractant away from an area, and (3) dispersing lactic acid attractant away from an area.

B. Organic $CO_2$ "Sink" Repellant Ability of the Apparatus

As aforementioned, the apparatus is able to effectively repel mosquitoes by at least the previously mentioned three mechanisms of (1) disrupting the insect's ability to fly and land on a target, (2) dispersing $CO_2$ attractant away from an area, and (3) dispersing lactic acid attractant away from an area. However, a fourth possible mechanism of repelling mosquitoes is also postulated. That is, the apparatus comprises a plating area component 100, which if sufficiently planted with vegetation would comprise a natural biological "sink" for $CO_2$. Thus, it is postulated that the present apparatus helps to lower $CO_2$ attractant from a given area, such as an otherwise concrete patio lacking vegetation, by harnessing the ability of plants to remove $CO_2$ from their surrounding air.

C. Combined Mechanical and Chemical Mosquito Repellant Ability of the Apparatus

As aforementioned, certain embodiments of the present apparatus utilize a chemical repellant in conjunction with a fan system.

For instance, certain embodiments utilize chemical repellant technology in conjunction with the aforementioned fan system technology to effectively repel mosquitoes. Specific chemical repellant agents that may be utilized with the apparatus are for example NA-Diethyl-meta-toluamide (DEET) or any other synthetic chemical that repels insects.

Natural chemical repellants may also be utilized in certain embodiments of the apparatus for example: Citronella Oil, Lemon Oil, Eucalyptus Oil, Cinnamon Oil, Castor Oil, Rosemary Oil, Lemongrass Oil, Cedar Oil, Peppermint Oil, Clove Oil, Geranium Oil, or any other natural compound that repels insects.

Furthermore, certain embodiments of the apparatus may be made out of a material that emits a chemical repellant that discourages insects from approaching.

Some embodiments may utilize combustible materials, such as a torch that burns citronella oil, in the planting area component 100 of the apparatus. Other embodiments may utilize a chemical repellant in the interior of the apparatus, such that the fan system 500 takes in ambient internal air that has been infused with the chemical repellant and then blows said air out through the air exhaust vents 501. The air would contain the chemical repellant and thus combine with the mechanical action of the artificially generated wind to provide a synergistic mosquito repellant.

EXAMPLES

Example 1

Mosquito Repellant Test

A. Protocol

A test of a preferred embodiment of the present apparatus was conducted on an outdoor patio, in on area heavily visited by mosquitoes. The preferred embodiment utilized a centrifugal fan system.

The test comprised utilizing the apparatus at a time of day in which mosquitoes frequently bite hosts. Human subjects were allowed to congregate in areas: (1) that were within the artificial wind field generated by the centrifugal fan system of the apparatus and (2) within areas that were not subject to the wind field generated by the centrifugal fan system of the apparatus.

The subjects were asked to observe the number of mosquito bites they received, while congregating in each area. The subjects were also asked to observe the number of mosquitoes that landed on their person, while congregating in each area.

B. Results

Wind speeds produced by the apparatus were measured. The tested apparatus generated wind speeds greater than 4 miles per hour at distances from the apparatus of up to 10 feet.

Subjects reported significantly less mosquito bites when standing in areas subject to the artificial wind field generated by the centriftigal fan system of the apparatus. The subjects also reported a lower number of mosquitoes landing on their person when standing in areas subject to the artificial wind, field, generated by the centriftigal fan system of the apparatus.

When the subjects moved into areas not subject to the artificial wind, generated by the apparatus there was a noticeable increase in the amount of mosquito bites they received and in the number of mosquitoes landing on their person.

The apparatus generated a "zone of repellancy" that gradually increased as one moved away from the apparatus. This zone of repellency is an area in which the wind speeds are greater than 4 miles per hour.

The zone of repellancy: increased as one moved away from the apparatus due to the unique wind pattern generated by the centriftigal fan that was utilized. The zone of repellancy was approximately (feet wide when standing 10 feet away from the front of the apparatus that contained the air exhaust vents blowing air from the apparatus. The zone increased to 10 feet wide when standing 15 feet away from the front of the apparatus. Moreover, the zone increased to 15 feet wide when standing 20 feet away from the front of the apparatus.

Subjects reported nearly no mosquito activity while standing within these zones of repellancy that were subject to the artificially generated wind of the apparatus.

The tested apparatus utilizing a centrifugal fan system was also unexpectedly discovered to repel mosquitoes more efficiently than an axial fan system.

While the apparatus has been described in the present application in connection with various embodiments, the scope of the apparatus is not intended to be limited to the particular embodiments so disclosed. On the contrary, the apparatus is intended to cover such alternatives, modifications, and equivalents, as may be included within the scope and spirit of the below claims.

What is claimed is:

1. An apparatus for repelling flying insects, comprising:
   a) a planting area component;
   b) a containment component; and
   c) a fan system,
   wherein said containment component comprises four walls and a base, and wherein said planting area component comprises four walls and a bottom surface, and wherein said planting area component is attached to the four walls of the containment component distal to the base of said containment component, such that the planting area component along with the four walls and base of the containment component form an internal enclosed space, and
   wherein said fan system is located within the internal enclosed space defined by the planting area component and containment component; and
   a chemical repellant element positioned inside the internal enclosed space within the containment component,
   wherein the chemical repellant element is emitted by the fan system through an air exhaust vent aperture on said containment component.

2. The apparatus according to claim 1, wherein said fan system is a centrifugal fan system.

3. The apparatus according to claim 1, wherein each of the four walls of the containment component comprise air intake vent apertures.

4. The apparatus according to claim 3, wherein said air intake vent apertures are located on the walls of the containment component in a position distal to the end of the walls that are attached to the planting area component and proximal to the base.

5. The apparatus according to claim 1, wherein one of the four walls of the containment component comprises said air exhaust vent apertures connected to said fan system.

6. The apparatus according to claim 1, wherein only one of the four walls of the containment component comprises said air exhaust vent apertures connected to said fan system.

7. The apparatus according to claim 1, wherein said planting area component comprises a drainage hole.

8. The apparatus according to claim 7, further comprising a drainage hose connected to said drainage hole.

9. The apparatus according to claim 1, further comprising a heating system.

10. The apparatus according to claim 1, further comprising a cooling system.

11. The apparatus according to claim 1, wherein said chemical repellant element comprises N,N-Diethyl-meta-toluamide.

12. The apparatus according to claim 1, wherein said chemical repellant element comprises at least one natural chemical repellant selected from the group consisting of Citronella Oil, Lemon Oil, Eucalyptus Oil, Cinnamon Oil, Castor Oil, Rosemary Oil, Lemongrass Oil, Cedar Oil, Peppermint Oil, Clove Oil, and Geranium Oil.

13. The apparatus according to claim 1, wherein said fan system is configured to generate wind of at least 4 miles per hour at a distance of at least 10 feet from the apparatus.

14. The apparatus according to claim 1, wherein said flying insects are mosquitoes.

15. A method of repelling flying insects from an area of concern, comprising:
   (a) providing an apparatus as recited in claim 1;
   (b) supplying power to said apparatus; and
   (c) activating said apparatus such that the supplied power causes the fan system to generate wind.

16. The method according to claim 15, further comprising:
   (d) congregating in an area that is subject to the wind generated by said apparatus, wherein said wind generated by the apparatus is at least 4 miles per hour.

17. The method according to claim 15, wherein said flying insects are mosquitoes.

18. An apparatus for repelling mosquitoes, comprising:
   a) a planting area component comprising four walls, a bottom surface, and a drainage hole located within said bottom surface:
   b) a containment component comprising four walls and a base, wherein one of the four walls of the containment component comprises air exhaust vent apertures, and wherein all four of the walls of the containment component comprise air intake vent apertures; and c) a centrifugal fan system comprising an internal fan wheel with a diameter of from about 5 to 20 inches, wherein said planting area component is attached to the four walls of the containment component distal to the base of said containment component, such that the planting area component along with the four walls and base of the containment component form an internal enclosed space, and wherein said centrifugal fan system is located within the internal enclosed space defined by the planting area component and containment component, and wherein said centrifugal fan system is configured to generate wind of at least 4 miles per hour at a distance of at least 10 feet from the apparatus, and wherein said air exhaust vent apertures are connected to said fan system; and a chemical repellant element positioned inside the internal enclosed space within the containment component, wherein the chemical repellant element is emitted by the fan system through an air exhaust vent aperture on said containment component.

\* \* \* \* \*